(12) United States Patent
Mehta et al.

(10) Patent No.: US 12,200,588 B2
(45) Date of Patent: Jan. 14, 2025

(54) SYSTEMS AND METHODS FOR HOLOGRAPHICALLY PRESENTING ITEMS BASED ON ITEM COMPATIBILITY WITH ACCOUNT FEATURES

(71) Applicant: Capital One Services, LLC, McLean, VA (US)

(72) Inventors: Milan Mehta, Glen Allen, VA (US); Gurpreet Singh Sandhu, Walnut Creek, CA (US); Benjamin Polk, Arlington, VA (US); Lee Adcock, Midlolthian, VA (US)

(73) Assignee: Capital One Services, LLC, McLean, VA (US)

( * ) Notice: Subject to any disclaimer, the term of this patent is extended or adjusted under 35 U.S.C. 154(b) by 333 days.

(21) Appl. No.: 17/818,641

(22) Filed: Aug. 9, 2022

(65) Prior Publication Data

US 2024/0056786 A1 Feb. 15, 2024

(51) Int. Cl.
*H04W 4/02* (2018.01)
*G06F 1/16* (2006.01)
*H04W 4/80* (2018.01)

(52) U.S. Cl.
CPC .............. *H04W 4/80* (2018.02); *G06F 1/163* (2013.01); *H04W 4/023* (2013.01)

(58) Field of Classification Search
CPC ....... H04W 4/80; H04W 4/023; H04W 4/026; G06F 1/163; G06F 1/1626; G06F 1/1694; G06F 1/1698; G03H 2001/2242; G03H 2227/03; G03H 1/2294
See application file for complete search history.

(56) References Cited

U.S. PATENT DOCUMENTS

| | | | |
|---|---|---|---|
| 2020/0387109 A1* | 12/2020 | Callagy | G03H 1/2294 |
| 2023/0139626 A1* | 5/2023 | Berliner | G06F 1/1694 |
| | | | 345/156 |
| 2023/0142110 A1* | 5/2023 | Kim | G06F 3/14 |
| | | | 704/235 |
| 2023/0188384 A1* | 6/2023 | Claffey | H04L 25/022 |
| | | | 375/262 |
| 2023/0333201 A1* | 10/2023 | Regani | G01S 13/86 |

* cited by examiner

*Primary Examiner* — Kenneth T Lam
(74) *Attorney, Agent, or Firm* — Foley & Lardner LLP

(57) ABSTRACT

In some embodiments, holographically displaying items based on item compatibility with user account features may be facilitated. In some embodiments, first and second mobile devices may be detected as being within a proximity threshold of a holographic display device, where the first mobile device is associated with a first user account and the second mobile device is associated with a second user account. Based on the detection, (i) navigation information of the first and second mobile devices, (ii) return value information indicating respective return values associated with candidate items, and (iii) account feature compatibility information may be obtained and inputted into a machine learning model. Despite a first candidate item being incompatible with a second account feature set for the second mobile device, a first holographic representation of the first candidate item may be displayed.

20 Claims, 6 Drawing Sheets

SYSTEMS AND METHODS FOR HOLOGRAPHICALLY PRESENTING ITEMS BASED ON ITEM COMPATIBILITY WITH ACCOUNT FEATURES

BACKGROUND

Unlike other forms of 3D displays, holographic displays can provide a 3D visual experience to multiple viewers without special glasses. Moreover, by precisely tailoring light fields, holographic displays can generate high-quality 3D scenes with full parallax, where the resulting image provide the same perspective of a scene to all viewers regardless of viewing angle. While such holographic technologies exist, they generally involve bulky systems, are cost prohibitive, and limited to static images. For example, holographic video displays are typically limited by pixel size and number, which restricts the holographic video displays to small images and narrow viewing angles.

SUMMARY

Methods and systems are described herein for improvements related to displaying items, such as facilitating a holographic presentation of an item via one or more viewing-angle-limited holographic displays, selecting one or more users from a set of detected users and generating a holographic presentation of an item directed to the selected users, or other aspects described herein.

As discussed above, holographic displays can provide a high-quality 3D visual experience without a viewer being required to wear special glasses (although glasses or other wearables may be used to provide its users with enhanced or user-tailored presentations), which can offer significant benefits to a number of sectors. As an example, museums often place items (e.g., artwork, statues, or other pieces) in strategic locations to accommodate the desires of visitors (e.g., limited-time exhibitions may be place near the museum entrance). Given the limited real estate, however, there are only so many such locations to display art. Although many museums have increasingly expanded in size to accommodate the differences in interests of its visitors, such expansions are costly to construct and maintain. Additionally, although physical expansion may help provide more locations to display artwork, the number of featured items may still be limited. To alleviate such issues, museums may use holographic display devices to increase the number of featured items that can be showcased (e.g., by presenting items to a customer where the items displayed may be tailored to a visitor).

As also discussed above, while holographic display systems that offer high-quality 3D visual experiences (e.g., a holographic art exhibition) do exist, such systems generally involve bulky systems, are cost prohibitive, and limited to static images. In the context of holographic videos or dynamic holographic images, for example, existing holographic display systems are restricted to presenting small 3D visual experience and limited viewing angles. Even with respect to static holographic images, more compact or cheaper holographic display systems may also suffer from limited viewing angles for larger holographic presentations. To address the foregoing issues, methods and system described herein may detect a relative direction of a selected user (e.g., relative to a holographic display) and move or configure the holographic display to center or move a viewing angle of the holographic display to enable the selected user to see a holographic presentation of the holographic display (e.g., by rotating or moving the holographic display or components thereof based on the detected user direction such that the user is within or continues to be within the viewing angle of the holographic display). In this way, for example, despite a limited viewing angle of the holographic display, such embodiments enable a user who may initially be outside the viewing angle to see the holographic presentation or allow a user who may walk outside the prior viewing angle to continue to see the holographic presentation (e.g., by dynamically moving the holographic display or components thereof based on the detected user direction, a predicted future location of the user, an eye-tracking-derived prediction indicating that the user will continue looking at the holographic presentation at the predicted future location, or other information).

Some embodiments may select first and second users from a set of users (e.g., users detected to be proximate a holographic display) and generate first and second holographic presentations personalized for the first and second users, respectively. As an example, during a first time period corresponding to the first holographic presentation, the holographic display may be controlled to center or move a viewing angle of the holographic display to enable the first user to see the first holographic presentation during the first time period (e.g., by moving the holographic display based on a detected user direction of the first user such that the first user is within or continue to be within the viewing angle of the holographic display during the first time period). After the first time period, and during a second time period corresponding to the second holographic presentation, the holographic display may be controlled to move the viewing angle of the holographic display to enable the second user to see the second holographic presentation during the second time period (e.g., by moving the holographic display based on a detected user direction of the second user such that the second user is within or continue to be within the viewing angle of the holographic display during the second time period). In this way, for example, such embodiments alleviate the issues of limited physical space for different holographic presentations (e.g., showcasing holographic artwork in prime areas of a museum) while still personalizing the user experience of such holographic presentations.

In some embodiments, the holographic display may include different subsets of display components, where each display component subset has a presentation viewing angle and is configured to present holographic content with such viewing angle. Some embodiments may select multiple display component subsets of the holographic display to generate a combined holographic presentation with a larger viewing angle (e.g., up to the sum of the viewing angles of each such display component subset) for one or more users. As an example, a first display component subset of the holographic display may be configured to have a first viewing angle, a second display component subset may be configured to have a second viewing angle, a third display component subset may be configured to have a third viewing angle, and so on. In one use case, the first and second display component subsets may simultaneously provide a personalized holographic presentation for one or more users that has a combined viewing angle (e.g., the sum or close to the sum of the first and second viewing angles), where the first display component subset presents a first instance of the holographic presentation with the first viewing angle, and the second display component subset presents a second instance of the holographic presentation with the second viewing angle (e.g., adjacent to the first presentation instance with the first viewing angle). In this way, for example, despite a limited viewing angle of each display component subset, such embodiments enable the resulting holographic presentation to have a larger viewing angle than each limited viewing angle of the first and second display component subsets, thereby improving the user experience of the users to which the holographic presentation is directed.

In some embodiments, two or more of the display component subsets of the holographic display may each present different holographic content to different users (e.g., by presenting holographic content personalized to the users who are in the viewing angle of the corresponding display component subset, without needing to move the display components to a detected direction of the users). In one use case, where the viewing angle of one holographic display component subset is not sufficient to cover a subset of users (to which the personalized holographic content is directed) (e.g., a user is not able to clearly see the content because the user is slightly outside the viewing angle), the system may cause another display component subset to simultaneously present the holographic content to enlarge the total viewing angle for the holographic content. In another use case, based on a direction that a targeted user is heading (e.g., that will cause the user to go outside of the viewing angle), the system may cause another display component subset to simultaneously present the holographic content to enlarge the total viewing angle for the holographic content (but the system may also deactivate presentation of the holographic content on one of the display component subsets when the user is no longer within the corresponding viewing angle of that display component subset, so that it can be used to present personalized holographic content for another user).

In some embodiments, spectacles or other wearable device of a user (e.g., proximate a holographic display external to the wearable device) may enhance a holographic presentation provided by the holographic display, and the user's account associated with the wearable device may indicate holographic augmentation or other enhancement features of the wearable device that are available to the user. In some embodiments, the availability of such holographic enhancement features or other account features may be used to as input (e.g., along with user distance of a user to the holographic display, a predicted user response of a user to certain holographic content, or other criteria input) to a machine learning model to identify one or more users for which a holographic presentation is to be personalized. As an example, a machine learning model may indicating a selection of a candidate item to be presented via a holographic display based on (i) distances of closer and father wearable devices (e.g., relative distances to the holographic display device), (ii) predicted user response value information related to first and second candidate items (e.g., predicted interest levels of the respective users of the wearable devices to the candidate items), and (iii) account feature compatibility information of the first and second candidate items (e.g., with account features of the respective users of the wearable devices). The machine learning model may indicate the most suitable item to be holographically displayed on the holographic display based on the foregoing inputs to the machine learning model.

As another example, with respect to selection of an item for a holographic presentation, a machine learning model may be configured to apply greater weight to predicted user responses (e.g., a predicted level of excitement or other predicted response of respective users to presentation of an item) over one or more other inputs. In one use case, between a first candidate item of interest to a first detected user and a second candidate item of interest to a second detected user, despite the first candidate item being incompatible with an account feature set of the second user (e.g., the second user's wearable device does not support certain holographic augmentation or other enhancement features for a holographic representation of the first candidate item) the machine learning model may indicate a selection of the first candidate item based on the predicted user response associated with the first candidate item have a higher value than the predicted user response associated with the second candidate item. For instance, a predicted level of excitement or engagement of the first user to the holographic representation of the first candidate item alone may be greater than the combined predicted levels of excitement or engagement of the first and second users to the holographic representation of the second candidate item. As such, the machine learning model may indicate selection of the first candidate item to facilitate a greater user experience or other return in the aggregate (e.g., despite a lower user experience level or a "null" return value for the second user or one or more other users).

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
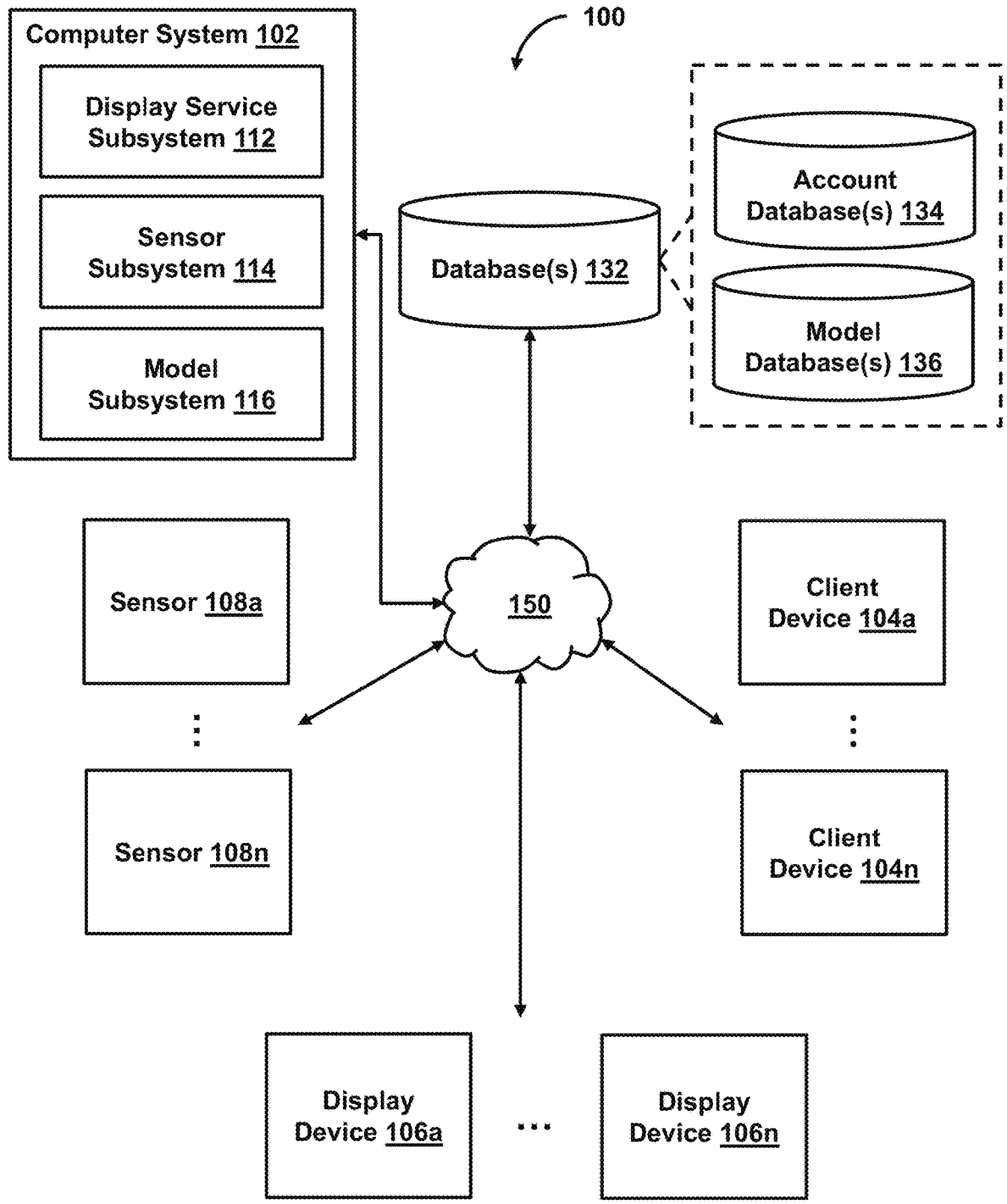
FIG. 1 shows a system for holographically displaying items, in accordance with one or more embodiments.

FIG. 1 shows a system 100 for holographically displaying items, in accordance with one or more embodiments. As shown in FIG. 1, system 100 may include computer system 102, client device 104 (or client devices 104a-104n), display device 106 (or display devices 104a-104n), sensor 108 (or sensors 108a-108n), or other components. Computer system 102 may include display service subsystem 112, sensor subsystem 114, model subsystem 116, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. Each display device 106 may include any type of display device. By way of example, display device 106 may include a holographic display (e.g., including one or more lasers, beam splitters or expanders, collimators, spatial light modulators, or other display components), Organic Light Emitting Diode (OLED) display, Light Emitting Diode (LED) display, Digital Light Processing (DLP) display, projector device, or other display devices. Each sensor 108 may include any type of sensor. By way of example, sensor 108 may include a Bluetooth beacon, proximity sensor, camera, infrared sensor, eye-tracking sensor, Near Field Communication (NFC) sensor, motion sensor, video motion sensor, microwave sensor, or other sensor. It should also be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, a holographic system (e.g., one or more holographic displays, its auxiliary devices, or other components) may create static holograms by using laser beams to encode an image onto a recording medium (e.g., a film, plate, or other medium). In some embodiments, the holographic system may create holographic videos or dynamic holographic images by sending the coherent light from lasers through one or more spatial light modulators (SLMs) configured to actively manipulate features of light waves (e.g., amplitude, phase, etc.), thereby effectuating the dynamic holograms. As discussed above, while holographic display systems that offer high-quality 3D visual experiences do exist, such systems generally involve bulky systems, are cost prohibitive, and limited to static images. In the context of holographic videos or dynamic holographic images, for example, existing holographic display systems are restricted to presenting small 3D visual experience and limited viewing angles (e.g., a ten-inch holographic video with a thirty-degree viewing angle or other combinations). Even with respect to static holographic images, more compact or cheaper holographic display systems may also suffer from limited viewing angles for larger holographic presentations.

In some embodiments, system 100 may provide a holographic presentation to one or more users based on detection of the users via one or more sensors. In some embodiments, system 100 may adjust one or more viewing angles of a holographic display system (or other display system) based on the detection of the users. As an example, system 100 may determine a direction of a user and adjust a first viewing angle of the holographic display system based on the user direction such that the user becomes within the adjusted first viewing angle of the holographic display system. In one use case, the user direction may be a relative direction of the user with respect to the holographic display system (e.g., a direction of the user relative to a center or other origin point of a holographic presentation of the holographic display system, a direction of the user relative to one or more components of the holographic display system, etc.).

In some embodiments, the holographic display system may be configured with multiple viewing angles, such as a first viewing angle having a first set of arms, a second viewing angle having a second set of arms (e.g., different from the first set of arms). As an example, the holographic display system may be configured to simultaneously provide holographic presentations via the multiple viewing angles. In some embodiments, a holographic display may include different subsets of display components, where each display component subset of the display component subsets has a presentation viewing angle and is configured to present holographic content with such viewing angle. As an example, each display component subset of the display component subsets may include one or more lasers and one or more spatial light modulators. As another example, each display component subset of the display component subsets may also include one or more beam splitters or expanders, collimators, or other components.

In some embodiments, system 100 may select multiple display component subsets of the holographic display to generate a combined holographic presentation with a larger viewing angle (e.g., up to the sum of the viewing angles of each such display component subset) for one or more users. As an example, a first display component subset of the holographic display may be configured to have a first viewing angle, a second display component subset may be configured to have a second viewing angle, a third display component subset may be configured to have a third viewing angle, and so on. In one use case, the first and second display component subsets may simultaneously provide a personalized holographic presentation for one or more users that has a combined viewing angle (e.g., the sum or close to the sum of the first and second viewing angles), where the first display component subset presents a first instance of the holographic presentation with the first viewing angle, and the second display component subset presents a second instance of the holographic presentation with the second viewing angle (e.g., adjacent to the first presentation instance with the first viewing angle). In this way, for example, despite a limited viewing angle of each display component subset, such embodiments enable the resulting holographic presentation to have a larger viewing angle than each limited viewing angle of the first and second display component subsets, thereby improving the user experience of the users to which the holographic presentation is directed.

In some embodiments, two or more of the display component subsets of the holographic display may each present different holographic content to different users (e.g., by presenting holographic content personalized to the users who are in the viewing angle of the corresponding display component subset, without needing to move the display components to a detected direction of the users). In one use case, where the viewing angle of one holographic display component subset is not sufficient to cover a subset of users (to which the personalized holographic content is directed) (e.g., a user is not able to clearly see the content because the user is slightly outside the viewing angle), the system may cause another display component subset to simultaneously present the holographic content to enlarge the total viewing angle for the holographic content. In another use case, based on a direction that a targeted user is heading (e.g., that will cause the user to go outside of the viewing angle), the system may cause another display component subset to simultaneously present the holographic content to enlarge the total viewing angle for the holographic content (but the system may also deactivate presentation of the holographic content on one of the display component subsets when the user is no longer within the corresponding viewing angle of that display component subset, so that it can be used to present personalized holographic content for another user).

In some embodiments, system 100 may determine an item for presentation on a display device (e.g., a holographic display device or other display device). For example, system 100 may determine the item for presentation based on (i) navigation information related to one or more user devices (e.g., information indicating speed, direction, acceleration, velocity, or other navigational information associated with the user devices), (ii) return value information of candidate items (e.g., predicted user responses to holographic presentations of the respective candidate items or other return value information), (iii) account feature compatibility information related to the candidate items (e.g., information indicating whether account feature sets associated with respective user accounts are compatible with holographic presentations of the candidate items or other account feature compatibility information), or (iv) other inputs.

In some embodiments, system 100 may detect first and second user devices (e.g., mobile devices or other user devices) as being within a proximity threshold of a holographic display device, where the first user device is associated with a first user account and the second user device is associated with a second user account. Based on the detection, system 100 may obtain (i) navigation information related to the first and second user devices, (ii) return value information related to candidate items of a candidate item set, and (iii) account feature compatibility information related to the candidate items indicating respective compatibilities of the candidate items associated with the first and second user accounts. In some embodiments, system 100 may provide the obtained information to a machine learning model to determine an item for presentation on the holographic display device.

In some embodiments, the machine learning model may indicate selection of a first candidate item over a second candidate item, despite the first candidate item being incompatible with the second user account feature set based on the return value information of the first candidate item being higher than the return value information of the second candidate item. For example, presenting a holographic representation of the item may be based on the respective distances of the user devices, and although a first user device (e.g., associated with a first user) is detected to be farther away, since the return value (e.g., an emotional response) of the first candidate item is greater than a second candidate item (e.g., associated with a second user), the first candidate item may be selected for presentation despite the first candidate item being incompatible with the second account feature set (e.g., respective of the second user). In this way, by presenting the first candidate item based on the foregoing information, the user experience may be improved as the user is able to visually see an item of interest that may evoke a greater emotional response than another.

Subsystems 112-116

In some embodiments, sensor subsystem 114 may detect first and second mobile devices (e.g., wearable or other mobile devices) being within a proximity threshold of a display device. For example, sensor subsystem 114 may continuously request proximity information related to the mobile devices from one or more sensors (e.g., sensors 108a-108n). In one use case, such sensors may include Bluetooth beacons (e.g., Bluetooth Low Energy beacons), proximity sensors, cameras, infrared sensors, or other sensors. In some embodiments, such sensors may be associated with (or otherwise related to) a display device (e.g., display device 106). As an example, sensors may be integrated into the display device or may be placed around (or nearby) the display device. In other embodiments, where multiple display devices are present, a first subset of sensors may be associated with a first display device, and a second subset of sensors may be associated with a second display device. In response to one or more sensors detecting one or more mobile devices, the sensors may notify sensor subsystem 114 of the detected mobile devices and may transmit information pertaining to respective distances of the mobile devices.

In some embodiments, where the sensors are Bluetooth beacons, the Bluetooth beacons may transmit periodic data packets that are received and processed by one or more nearby devices (e.g., mobile devices proximate the Bluetooth beacons). The Bluetooth beacons may transmit one or more wireless data or control signals. When a mobile device receives one or more signals (e.g., from one or more Bluetooth beacons), the mobile device may use the signals to determine a distance between a holographic display device and the mobile device. For instance, where the signals have a measured power level, the mobile device may predict the distance based on the measured power level. For example, a mobile device may measure the strength of such signals transmitted by the Bluetooth beacons to determine a Received Signal Strength Indicator (RSSI) value. The RSSI value may be measured in decibels, decibel-milliwatts, on a logarithmic scale, and/or as a percentage. The RSSI value may additionally correspond to a distance based on Bluetooth specifications indicating a predetermined distance for a measured power level. In some embodiments, in response to the mobile device determining such distance, the mobile device may transmit the determined distance to display sensor subsystem 114.

Sensor subsystem 114 may receive the determined distance and may compare the determined distance to a proximity threshold value. As example, the proximity threshold may be a predetermined proximity threshold value, such as a predetermined distance (e.g., 1 mm, 1 meter, 5 meters, 10 meters, 50 meters, 100 meters, etc.) between a display device and a mobile device. Sensor subsystem 114 may determine whether the determined distance satisfies the proximity threshold value. For example, if the determined distance meets or fails to exceed the proximity threshold value, sensor subsystem 114 may determine that the corresponding mobile device is within a proximity threshold of a display device.

Figure 3:
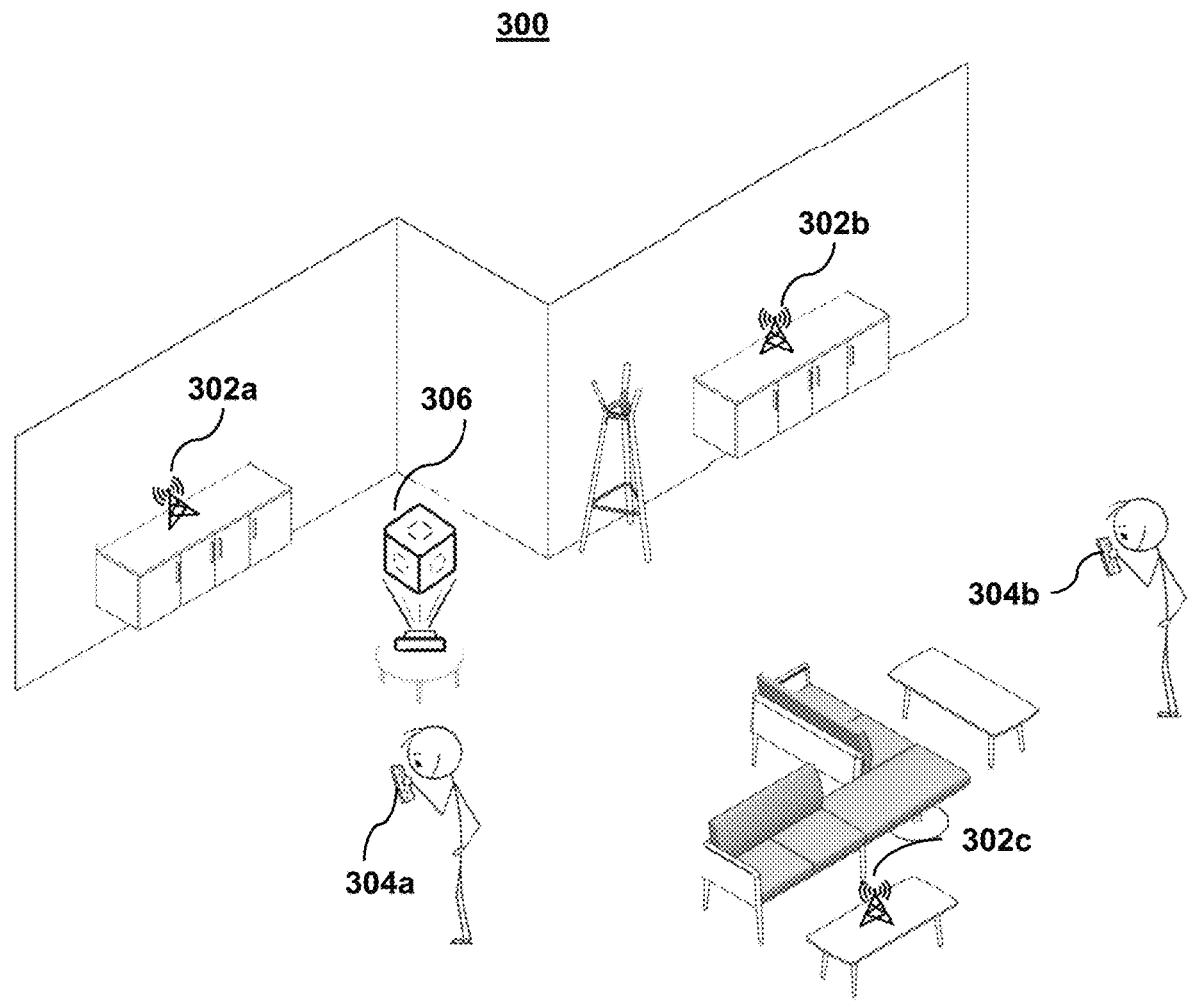
FIG. 3 shows a setting of a plurality of users with one or more display devices, in accordance with one or more embodiments.

In one use case, referring to FIG. 3, where multiple users are walking in an art museum and a display device 306 is present, sensors 302 may detect whether users are within a proximity threshold of a display device 306. For instance, to avoid presenting a piece of art to a user that is "too far" away from a display device, the sensors may detect whether one or more users are within a proximity threshold of a display device. For example, as many users may be in the museum, not all users may be good candidates to present a piece of art based on their location relative to a display device. To ensure that the art is presented to users that are nearby to a display device, the sensors may detect that candidate users (e.g., users that are nearby a display device) are within a proximity threshold of a display device. In this way, the system may decrease the amount of computer processing resources required to display items to users by processing a small subset of user data (e.g., users that are nearby a display device) as opposed to every mobile device detected to be in a given area.

Referring back to FIG. 1, in some embodiments, based on a detection of mobile devices, display service subsystem 112 may obtain information related to mobile devices or the users of the mobile devices, respectively. For example, based a detection of a first and second mobile device being within a proximity threshold of a display device, display service subsystem 112 may obtain information such as navigation information related to the first and second mobile devices and account related information with respect to the first and second mobile devices. For example, the first and second mobile devices, respectively, may be associated with a first and second user account. Each of the first and second user accounts may further be associated with (ii) return value information indicating respective return values associated with candidate items, and (iii) account feature compatibility information indicating respective compatibilities of candidate items of a candidate item set with account feature sets associated with first and second user accounts. As an example, the navigation information may indicate navigational information of a mobile device. For instance, the navigational information may indicate a speed, direction, acceleration, velocity, GPS coordinates, distance, or other navigational information of a mobile device with respect to display device. As another example, the candidate items may represent items of interest with respect to a user. For instance, users may have a set of items in which they are interested in viewing (e.g., a piece of art, a statue, a product, etc.). Each candidate item may be associated with a return value (e.g., an emotional response, or other return value) or other information. Furthermore, where the first and second mobile devices are associated with a first user account and a second user account, respectively, such user accounts may be associated with account feature sets indicating account-related information that may be associated with items and display devices.

In some embodiments, display service subsystem 112 may obtain information from database 132. For example, database 132 may include multiple databases storing information such as account database 134 and model database 136. As an example, account database 134 may store information related to user accounts. For example, each user account stored in account database 134 may include account-related information such as an account identifier (e.g., a name of a user, a screen name, a user name, a character string, an emoji, or other account identifier), item related information such as a set of items of interest to the user (e.g., an array of items of interest, a list of items of interest, etc.), return value information associated with each item of the set of items of interest to the user (e.g., an emotional response value, a value of worth to the user, a rating from the user, a monetary value, a return of investment value, a net value of the item, or other return value), item identifiers associated with each item of the set of items of interest to the user (e.g., an item name, a barcode, an SKU number, etc.), timestamps associated with when each item of the set of items of interest to the user were added (e.g., a time/date when a user selected an item of interest), item display data (e.g., a type of display file (e.g., .mp4, .mpeg, .mov, .avi, .jpeg, .png, etc.)), a file including data of a holographic representation of the item, an image of the item, a video of the item, etc.), account compatibility information (e.g., item rendering capabilities respective to the account or a mobile device (e.g., 2D/3D rendering), permissions to render a presentation of an item, account permissions, approved display device information, etc.), a set of account features such as a rendering service, the type of files representing an item that are approved, for example, such as the type of display file (e.g., .mp4, .mpeg, .mov, .avi, .jpeg, .png, etc.), subscription service, financial information of a user, an account balance, a banking balance, a credit limit, a number of how many items may be rendered/processed with respect to an account, or other account features. As another example, model database 136 may include a plurality of prediction models. For example, the prediction models stored in model database 136 may include Neural Networks (NN), Recurrent Neural Networks (RNN), Convolutional Neural Networks (CNN), Support Vector Machines (SVM), Generative Adversarial Networks (GAN), or other prediction models. In some embodiments, the prediction models stored in model database 136 may be pretrained. For example, by having pretrained prediction models stored in a database, one or more transfer learning techniques may be applied to fine tune any pretrained prediction models, thus decreasing the amount of computer processing resources needed to train a prediction model.

In some embodiments, item-related information may be stored in account database 134 based on a user input. For example, users may select items in which they are interested and such items may be stored in association with their account. For example, when a user logs into their account, a user may select items they wish to see by a display device. When a user selects an item, an identifier associated with the item may be stored in association with their account, which may in return be stored in account database 134. For instance, the item may be associated with (i) an item identifier and (ii) the user account identifier. When a user selects an item in which they are interested, the user account identifier and the item identifier may be stored in association with one another in account database 134 for later retrieval. Thus, when a user is detected to be within a proximity threshold of a display device, display service subsystem 112 may obtain a set of candidate items in which the user may be interested. For example, display service subsystem 112 may perform a query of account database 134 to obtain a set of candidate items in which the user is interested by searching for an account identifier associated with the user. In response to the query, account database 134 may return all item identifiers that are associated with the account identifier. In this way, users may not be required upon being within a proximity threshold of a display device to select items in which they are interested, but may rely on previously selected items of interest to be obtained—thereby improving the user experience.

In a use case, in the context of an art museum, a user may log into their user account (e.g., via a mobile device or other computing device) to select pieces of art in which they are interested. Upon selection of a piece of art, an artwork identifier (e.g., an artist name, a barcode, a serial number, or other identifier) may be stored in association with the user account in account database 134. When the user travels to an art museum having display devices (e.g., where artwork may be displayed), in response to one or more sensors detecting a user is within a proximity threshold of a display device, display service subsystem 112 may query the database for artwork of interest to the user. The query may return a set of artwork of interest to the user, where such returned artwork may be candidate items for display.

In another user case, in the context of a retail store, a user may log into their user account to select items in which they are interested in purchasing. For example, a user may select a television, a virtual reality headset, a computer, a book, or other item. Upon such selection, a barcode may be stored in association with the user account in account database 134. In this way, when the user visits the retail store when one or more display devices are present and the user is detected to be nearby (e.g., within a proximity threshold of the display device), such items may be retrieved to be displayed on the display device.

In some embodiments, sensor subsystem 114 may determine that mobile devices are not within a proximity threshold of a display device, but may display items for presentation. For example, sensor subsystem 114 may detect mobile devices as being near a display device, however, the mobile devices are not within the proximity threshold of the display device. For example, the proximity threshold may be set to 4 feet (e.g., within 4 feet of a display device), however, sensor subsystem 114 may detect that a mobile device is 10 feet away from the display device. Although no mobile devices may be within the proximity threshold, display service subsystem 112 may alternate items being presented on a display device to ensure that resources are not wasted (e.g., by not displaying any item at a given time on a display device, wasting energy powering the display device when no items are being presented, etc.).

For example, in some embodiments, sensor subsystem 114 may determine that a first and second mobile device are not within a proximity threshold of a display device. In response to the first and second mobile device not being within the proximity threshold of the display device, display service subsystem 112 may display a representation of a first candidate item of interest (e.g., associated with the first user) for a first time duration, and may display a representation of a second candidate item of interest (e.g., associated with the second user), for a second time duration subsequent to the first time duration. For example, the time durations may be 1 second, 2 seconds, 1 minute, 2 minutes, 1 hour, 2 hours, 1 day, 2 days, 1 month, 2 months, etc. In some embodiments, where a user account may include item-related information including a set of items of interest, display service subsystem 112 may select a candidate item of interest for each of respective users and may alternate displaying a representation of each of the candidate items for a predetermined time duration. For instance, display service subsystem 112 may select a first and second candidate item of interest, respective to each user, based on item-related information such as (i) the time at which the respective user added or selected an item of interest, (ii) based on the return value associated with an item, or other information. For example, display service subsystem 112 may select a first candidate item (e.g., for the first user) based on the first candidate item being the first (or earliest) item of interest added to the set of items of interest for the first user. Similarly, display service subsystem 112 may select a second candidate item (e.g., for the second user) based on the second candidate item being the first (or earliest) item of interest added to the set of items of interest for the second user. The first candidate item of interest of the first user may be displayed for 5 seconds, and then the second candidate item of interest of the second user may be displayed for 5 seconds in an alternating pattern. In this way, although the users may not be within a close range of the display device, the system may ensure that the display devices are not being wasted (e.g., by not displaying an item), candidate items of interest of each respective user and alternate presentation of such candidate items.

Additionally or alternatively, after a first candidate item of interest of the first user has been displayed, and after the second candidate item of interest of the second user has been displayed, a third candidate item of interest of the first user (e.g., that is different from the first candidate item of interest) may be selected for display (e.g., based on item-related information). Likewise, a fourth candidate item of interest for the second user may be selected to be displayed after the third candidate item for a time duration. In this way, for example, not just one item may be displayed, but multiple items, thereby improving the user experience. Similarly, as other users (e.g., other than the first and second users) may be able to see the presentation of such items, this may also improve the user experience for the other users as they may view items in which they may not have known they would have been interested.

In a use case, in the context of an art museum, a large amount of visitors may be expected. However, such visitors may expect there to be art in their field of view at all times. Thus, any display devices not utilized may cause a poor user (e.g., visitor) experience. To overcome this, although some users/mobile devices may not be within a proximity threshold of a display device, sensor subsystem 114 may nonetheless detect mobile devices that are outside of a proximity threshold and cause display service subsystem 112 to display artwork in an alternating fashion that is respective of the mobile devices that are detected. For example, a first user and a second user may be detected (e.g., based on navigation information respective to the first and second user's mobile devices) to be outside of the proximity threshold of a display device. Sensor subsystem 114 may detect the mobile devices of these users and communicated with display service subsystem 112 to obtain artwork of interest of such users. Upon retrieving the artwork of interest (e.g., from account database 134), display service subsystem may display a first artwork of interest for the first user for a first time period, and then may display a second artwork of interest for the second user for a second time period. In this way, for example, visitors in the museum may experience a variety of artwork.

In another use case, in the context of a retail store, the business may want to display items available for purchase that are of interest to users at all times. To accomplish this, sensor subsystem 114 may detect mobile devices as being within the store but that are outside of a proximity threshold of a display device. Sensor subsystem 114 may communicate with display service subsystem 112 to inform display service subsystem 112 of the detected mobile devices (e.g., users) and may cause display service subsystem 112 to obtain products of interest of all of the detected users (e.g., by querying account database 134 for products of interest respective to each user). In some embodiments, display service subsystem 112 may be returned with respective sets of products of interest to each user, and may select candidate products to be displayed on display devices within the store. For example, where a first and second user are detected to be within the store, display service subsystem 112 may select a first candidate product from a first set of products of interest of the first user and may select a second candidate product from a second set of products of interest of the second user. In some embodiments, the first and second products of interest may be selected based on having the highest return value (e.g., being the most expensive product) of all of the products included in the respective first and second sets of products of interest. For instance, display service subsystem 112 may select the first candidate product of interest for the first user by comparing the return value of each product of interest of the first set of products of interest to one another. Based on a product of interest having the highest return value (e.g., being the most expensive), display service subsystem 112 may select the product of interest having the highest return value as the first candidate item of interest for the first user. Likewise, display service subsystem 112 may select the second candidate product of interest for the second user by comparing the return value of each product of interest of the second set of products of interest to one another, and may select the product of interest having the highest return value as the second candidate product of interest for the second user. Upon display service subsystem 112 having selected the first and second candidate products of interest, respective of each user, display service subsystem may display a representation of the first and second candidate products of interest in an alternating fashion. In this way, for example, the user experience may be improved as the users may see a representation of products of interest on a display device.

In some embodiments, display service subsystem 112 may obtain return value information of candidate items. For example, in response to a detection of mobile devices being within a proximity threshold of a display device, display service subsystem 112 may obtain return value information of candidate items. For instance, the return value information may include a value of the item. As an example, the value of the item can be any value that may be related to the item such as an emotional value (e.g., an emotional response a user may have to an item), a monetary value of the item (e.g., what the item is worth), a return of investment value, a profit margin value, a net value (e.g., a value between how much the item cost to make vs. how much the item retails for), or other return value. As discussed above, in some embodiments, the return value (or return values) may be stored in association with the items in account data database 134.

In a one use case, in the context of an art museum, the return value information may be associated with an emotional response a user may have with respect to a piece of art. For example, art aficionados continuously seek artwork that is described as "powerful" or "moving." Such artwork oftentimes invokes an emotional response to a person (e.g., a user). In many cases, certain artwork is more likely to invoke an emotional response of a user than one or more other users. Such emotional response may be represented as a value, whether numeric or descriptive, to show a level of emotional response. For example, in some instances, where the return value of artwork is normalized on a scale 0-10, with 0 being the least emotionally evoking and 10 being the most emotionally evoking, data from a variety of sources (e.g., online user surveys, textbooks, search engine histories, user inputs) may be aggregated to determine a return value of a piece of art. Thus, with each piece of art having a return value, different artworks may be compared based on the return value when determining a piece of art to display on a display device.

In another use case, in the context of a retail store, the return value information of an item may be associated with a value of worth of the item. For example, the return value, as discussed above may represent a price of an item, a net value of an item, a return on investment (e.g., a monetary amount denoting how much a business may make if such item is displayed), expected profitability of the item (e.g., how much a business paid for the item vs. sale price of the item), or other return value information. In such context, this information may be extremely valuable when determining whether to present an item for one user over another item for another user from a business standpoint. For example, as more and more businesses expect to reap higher profits, the return value of an item may be important in balancing not only the needs of the business, but also the needs of a user. For instance, all businesses hope their customers have a positive experience while shopping, however the business also expects to be profitable. Additionally, businesses generally do not want their customers putting themselves in a negative financial situation (e.g., purchasing an item they do not have money for) which may result in a poor credit score, or worse. As will be explained later, using return value information of items of interest of a user, the system may effectively balance the tension between profitability needs of a business and customer experience.

In some embodiments, display service subsystem 112 may obtain account feature compatibility information. For example, display service subsystem 112 may obtain, based on the detection of mobile devices being within a proximity threshold of a display device, account feature compatibility information. The account feature compatibility information may indicate respective compatibilities of candidate items of a candidate item set with account feature sets associated with first and second user accounts. For example, where a first mobile device (e.g., associated with a first user account) is detected to be within a proximity threshold of a display device, display service subsystem 112 may query account database 134 for an account feature set associated with the first user account. Additionally, display service subsystem 112 may query account database 134 for a set of items (e.g., items of interest of the user). As an example, by using an account identifier associated with the first user account, display service subsystem 112 may query the account database 134 for the account feature set and the set of items. Account database 134 may return the account feature set and the set of items to display service subsystem 112, and display service subsystem 112 may determine whether an item, or alternatively, the set of items, are compatible with the account feature set.

As an example, in the context of an art museum, display service subsystem 112 may obtain account feature compatibility information of a first and second mobile device detected as being within a proximity threshold of a display device. For example, where the display device is a holographic display device, the account feature compatibility information may indicate whether a piece of art in which the user is interested may be rendered on the holographic display device with respect to the user's account features. As one example, in the context of a subscription service associated with the user account, the account feature set of the user may include a value indicating how many pieces of art may be rendered before a limit is reached. For instance, where the limit is set to 5 (e.g., only 5 pieces of art may be displayed on the holographic display device before a user must make an additional purchase to display more artwork), the account compatibility information may compare how many pieces of art have been displayed in association with the user account to the account display limit. If the number of pieces of art that have been displayed fails to meet or exceed the account display limit, then the account feature compatibility information may indicate that the candidate artwork is compatible with the user's account features. On the contrary, if the number of pieces of art that have been displayed exceeds the account display limit, then the account feature compatibility information may indicate that the candidate artwork is incompatible with the user's account features.

In some embodiments, where multiple mobile devices are detected, the account feature compatibility information may take into account the respective compatibilities of each candidate item with respect to each user account. For instance, in some embodiments, the account feature compatibility information may indicate (i) a first candidate item being compatible with a first account feature set associated with a first user account but incompatible with a second account feature set associated with a second user account and (ii) a second candidate item being compatible with both the first and second account feature sets.

In one use case, in the context of an art museum, where a first and second mobile device are associated with a first user account and a second user account, respectively, display service subsystem 112 may obtain account feature compatibility information indicating respective compatibilities of candidate items of a candidate item set with the first and second account feature sets. For example, the candidate item set may include a first candidate item (e.g., artwork in which the first user is interested) and a second candidate item (e.g., artwork in which the second user is interested). To determine which piece of art to display on a display device, the respective compatibilities of the artwork may be considered with respect to account feature sets of the first and second users. For example, in some cases, a piece of artwork may be compatible with one user's account feature set but not with another user's account feature set. For instance, where a first user account feature set includes a first rendering service and a second user account feature set includes a second rendering service, the piece of artwork may be compatible with the first rendering service but incompatible with the second rendering service. As an example, the first and second rendering services may be different types of rendering services that allow a piece of art to be visually rendered (e.g., to be displayed on a display device). Rendering an image (e.g., image synthesis) may refer to the process of generating an image or model (e.g., 2D or 3D model) from a given set of data. Different rendering services may be available such as Unity®, Blender®, 3*ds* Max Design® or other rendering software. Such rendering services may be associated with user account feature sets, and thus the piece of art in which a given user is interested must be compatible with a feature set (e.g., a rendering service) of the user's account. Therefore, in order to ensure that art may be displayed on a display device a candidate item must be compatible with at least the user's account.

In some embodiments, determining whether an item is compatible with a user account feature of the user account feature set may be based on comparing item-related information to a user account feature. For example, as discussed above, the item related information may include return value information associated with each item of the set of items of interest to the user (e.g., an emotional response value, a value of worth to the user, a rating from the user, a monetary value, a return of investment value, a net value of the item, or other return value), item identifiers associated with each item of the set of items of interest to the user (e.g., an item name, a barcode, an SKU number, etc.), timestamps associated with when each item of the set of items of interest to the user were added (e.g., a time/date when a user selected an item of interest), or item display data (e.g., a type of display file (e.g., .mp4, .mpeg, .mov, .avi, .jpeg, .png, etc.)). Display service subsystem 112 may determine whether an item is compatible based on comparing item-related data to a user account feature of the user account feature set. For example, where the item display data indicates a .mov file and a user account feature indicates that an approved file format (e.g., supported by the user account) is a .mov file type, display service subsystem 112 may compare the item display data to the approved display file type of the user account to determine a match. Based on the matching, display service subsystem 112 may determine that the item is compatible with the account feature. Alternatively, if there is not a match, display service subsystem 112 may determine that the item is incompatible with the account feature.

In some embodiments, a holographic presentation (e.g., of an item) may be enhanced based on a user's wearable device. For instance, the user's account may be associated with a wearable device (e.g., of the user) and an account feature set may indicate available features that may enhance a holographic presentation of an item via a holographic display device. The available features may indicate holographic augmentation, augmented reality, virtual reality, or other enhancement features of the user's wearable device. Where the account features indicate such enhancement features, account feature compatibility information may indicate the compatibility between an item and one or more of the enhancement features. For example, the account feature compatibility information may indicate whether an item (e.g., an item of interest to the user) is able to be visually enhanced. For instance, where the item is a piece of artwork and an enhancement feature is configured to cause the artwork to move (or otherwise be animated), the account compatibility information may indicate a "yes" or "no" based on item information (e.g., whether there is sufficient data to be processed to animate the artwork) and whether the user's wearable device is configured to process such information (e.g., based on an available account feature).

For example, display service subsystem 112 may obtain item display data and may compare the item display data to an enhancement feature of the user account feature set (that is associated with the user's wearable device) to determine the user account compatibility information. For instance, where the item is a piece of artwork that is associated with display data in .mpeg format, display service subsystem 112 may compare the display data (e.g., of the artwork) to the user account feature set to determine whether the user's wearable device is able to process the display data and augment a holographic presentation of the item. If the user's wearable device is able to render an augmented reality version of the piece of artwork (e.g., by animating the artwork based on the display data), display service subsystem 112 may determine that the user account feature set is compatible with the item information and may render an animated (or augmented reality) version of the artwork. Since the animated/augmented version of the artwork may be visually seen by the user wearing the wearable device, other users in proximity of the holographic display device may see the non-animated version (e.g., due to the other users not wearing a wearable device, or alternatively, the other user's account feature set is not compatible with the display data). In this way, the holographic presentation of the item may be personalized to the user while enhancing the holographic presentation provided by the holographic display device—thereby further improving the user experience.

In some embodiments, item compatibility with a user account feature set may be based on an item being compatible with a threshold amount of features of a user account feature set. For example, display service subsystem 112 may compare a first candidate item (or item-related information) to each account feature of a first account feature set associated with the first user to determine whether the first candidate item is compatible with a first threshold amount of account features of the first account feature set. For instance, where a user account feature set includes multiple account features (e.g., rendering service, financial information, number of how many items may be rendered/processed with respect to an account, etc.), display service subsystem 112 may compare the item (or item-related information) to each of the features of a user account feature set. As an example, the comparisons may indicate whether the item is compatible with a given feature of a user account feature set, or whether the item is incompatible with a given feature of a user account feature set. For instance, a first candidate item may be compatible with a first and second account features of a first account feature set, but not a third account feature of a first account feature set. Display service subsystem 112 may compare the amount of account features the first candidate item is compatible with to a first threshold amount of account features.

In some embodiments, the threshold amount of account features may be predetermined (e.g., 1 account feature, 2 account features, 3 account features, etc.). However, other embodiments, the threshold amount of account features may be dynamically determined based on the amount of account features a given account feature set includes. For instance, the threshold amount of account features may be a percentage (e.g., 50%, 60%, 70%, etc.) of a total amount of account features an account feature set includes. Additionally or alternatively, display service subsystem 112 may determine that an item is compatible with a threshold amount of account features based on whether the amount of features that an item is compatible with meets or exceeds the threshold amount of account features. For instance, in the case of a predetermined threshold amount of account features, where the threshold amount of account features is 2, if an item is compatible with at least 2 of the account features of an account feature set, then display service subsystem 112 may determine that the item is compatible with the account feature set. As another example, in the case of a dynamic threshold amount of account features, where the threshold amount of account features is 50%, if the total amount of account features for a given account feature set is 5, then display service subsystem 112 may determine that the item is compatible with the account feature set if the item is compatible with 3 or more account features of the account feature set.

In some embodiments, display service subsystem 112 may compare the first candidate item to each account feature of the second account feature set associated with the second user to determine whether the first candidate item is compatible with a second threshold amount of account features of the second account feature set. For example, the first candidate item (or item-related information) may be compared to each account feature of a second account feature set (e.g., associated with a second user) to determine whether the first candidate item is compatible with a threshold amount of account features of the second account feature set. In response to the first candidate item being incompatible with the second threshold amount of account features of the second account feature set, display service subsystem 112 may determine that the first candidate item is incompatible with the second account feature set associated with the second user. In some embodiments, display service subsystem 112 may compare a second candidate item to each account feature of the first and second account feature sets associated with the first and second user, respectively, to determine whether the second candidate item is compatible with a third and fourth threshold amount of account features of the first and second account feature sets, respectively. For example, display service subsystem 112 may compare a second candidate item (e.g., an item of interest to the second user) to each of the account feature sets of the first user and the second user. In response to the second candidate item being compatible with the third and fourth threshold amount of account features of the first and second account feature sets, respectively, display service subsystem 112 may determine that the second candidate item is compatible with both the first and second account feature sets associated with the first and second users, respectively. In this way, the obtained or otherwise determined account feature compatibility information may indicate the respective compatibilities of first and second candidate items with respect to a first and second account feature set. Such account feature compatibility information may be useful when determining an item to be displayed via a display device (e.g., to ensure an effective rendering of an item, to ensure that an item is "allowed" to be displayed on a display device, etc.).

In one use case, in the context of a retail store, display service subsystem 112 may determine that a candidate product is compatible with an account feature set based on (i) return value information of the candidate product and (ii) financial information of the user account. For example, display service subsystem 112 may obtain the return value information associated with the candidate product of interest to a user and the financial information associated with the user account. For instance, where the return value information of the candidate product indicates a price of the item, and the financial information associated with the user indicates a balance of a user's account (e.g., balance of a bank account), display service subsystem 112 may compare the price of the item to the balance of the user's account. If the item is priced higher than the balance of the user's account, display service subsystem 112 may determine that the candidate product is incompatible with the user's account (or user account feature). Alternatively, if the item is prices lower than the balance of the user's account, display service subsystem may determine that the candidate product is compatible with the user's account. In this way, the user experience may be improved by ensuring that a user is not enticed (e.g., via a presentation of the product) with purchasing a product that the user cannot afford. For example, it is not in the interest of the business or the user to purchase an item that would negatively affect the user. Thus, by only presenting products that a user can afford, the user experience may be improved as the user need not worry about being enticed to purchase an item they cannot afford.

Due to the complexity of accounting for the navigation information of mobile devices, return value information of candidate items, and account feature compatibility information, a machine learning model may be used to efficiently account for this complex information to determine the most suitable item to be displayed on a display device. However, some information may be more important than other information when making such a determination. Thus, a specialized machine learning model may be used to aid in determining which item to display when given the navigational information of mobile devices, the return value information of candidate items, and the account feature compatibility information.

In some embodiments, model subsystem 116 may train or configure one or more prediction models to facilitate one or more embodiments described herein. In some embodiments, such models may be used to select an item to be displayed via a display device. As an example, such models may be trained or configured to perform the foregoing functions by respectively mutually mapping input data and output data in nonlinear relationships based on learning (e.g., deep learning). Additionally, one or more pre-trained prediction models may be stored in model database 136. For example, model database 136 may store a plurality of machine learning models configured to generate predictions related to selecting the most suitable item to be displayed via a display device.

In some embodiments, the prediction models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 4:
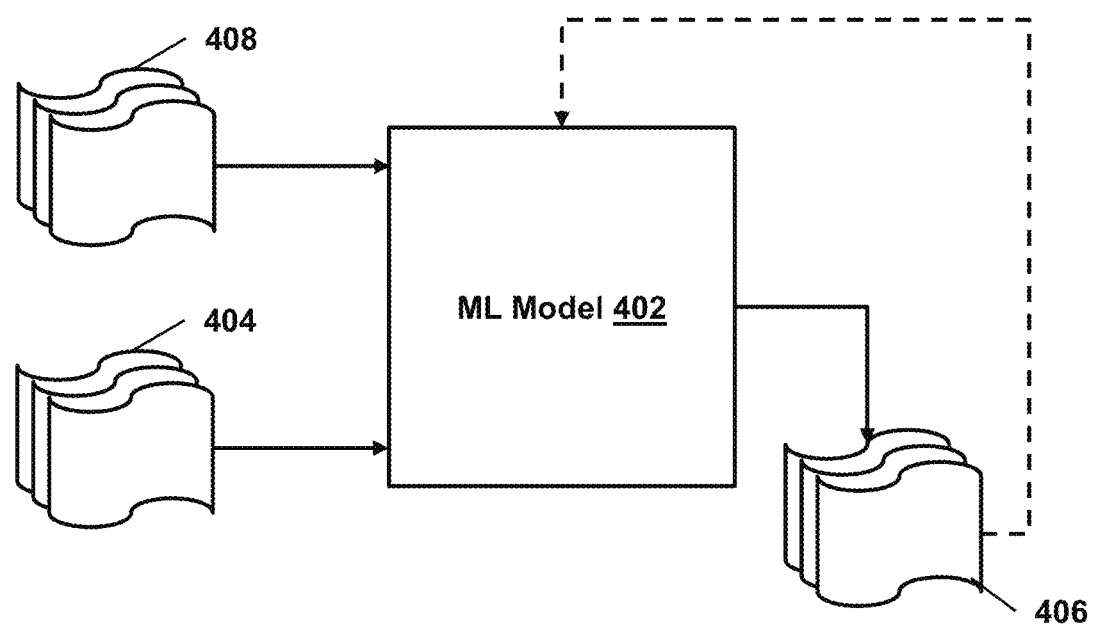
FIG. 4 shows a machine learning model configured to determine items to be displayed via a display device, in accordance with one or more embodiments.

As an example, with respect to FIG. 4, machine learning model 402 may take inputs 404 and provide outputs 406. In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In another use case, machine learning model 402 may include hyperparameter inputs 408. For example, hyperparameters are parameters whose value is used to control the learning process. For instance, hyperparameters may indicate a learning rate, size of network (e.g., number of layers, number of nodes, etc.), number of epochs, model architecture, or other information. In one use case, the hyperparameter inputs 408 may correspond to or otherwise be associated with inputs 404. As an example, where the hyperparameter input is a learning rate, a higher learning rate value may be used as the hyperparameter input 408 based on a first set of inputs 404 and a lower learning rate value may be used as the hyperparameter input 408 based on a second set of inputs 404. In this way, for example, the machine learning model 402 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may be input to the input layer in various forms, and, in various dimensional forms, may be input to respective nodes of the input layer of the neural network. In the neural network, nodes of layers other than the output layer are connected to nodes of a subsequent layer through links for transmitting output signals or information from the current layer to the subsequent layer, for example. The number of links may correspond to the number of nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, as referring to the hardware implemented connections or the corresponding "connection weights" provided by those connections of the neural network. During training and implementation such connections and connection weights may be selectively implemented, removed, and varied to generate or obtain a resultant neural network that is thereby trained and that may be correspondingly implemented for the trained objective, such as for any of the above example recognition objectives.

In some embodiments, machine learning model 402 may be trained based on training data comprising (i) navigation information of mobile devices with respect to a display device, (ii) return value information of items, and (iii) account feature compatibility information to generate predictions related to which candidate item of a candidate item set to display on a display device. For example, the navigation information of mobile devices may include speeds, directions, accelerations, velocities, GPS coordinates, distances, or other navigational information of mobile devices with respect to display device. Additionally, the return value information of items may include values of items (e.g., emotional value, monetary value, net value, etc.). Furthermore, the account feature compatibility information may include respective compatibilities of items with account feature sets. In some embodiments, machine learning model 402 may be trained on such training data. For instance, machine learning model 402 may take the training data as input 404, and generate a prediction indicating an item to be displayed as output 406. For example, the prediction may be based on items associated with the return value information and the account feature compatibility information. As an example, the prediction indicating of an item to be displayed (e.g., on a display device) may be an item identifier (e.g., an item name, a barcode associated with the item, etc.). In some embodiments, the generated prediction indicating an item to be displayed may be fed back into machine learning model 402 to update one or more configurations (e.g., weights, biases, or other parameters) based on its assessment of its prediction (e.g., outputs 406) and reference feedback information (e.g., user indication of accuracy, reference labels, or other information).

As an example, referring back to FIG. 1, in some embodiments, model subsystem 116 may provide training data to a prediction model to train a prediction model. For instance, in some embodiments, model subsystem 116 may obtain a prediction model (e.g., a machine learning model) from model database 136. In such a case, model subsystem 116 may train the selected prediction model based on training data (e.g., return value information, account feature compatibility information, etc.) stored in (or otherwise derived from) account database 134. Additionally, the training information may also include navigation information associated with mobile devices. For example, the navigation information may be obtained from one or more mobile devices detected to be within a proximity threshold of a display device and such navigation information may be additionally used to train the prediction model. Once the prediction model is trained, model subsystem 116 may provide the prediction model with inputs to generate a prediction of an item to be displayed via a display device. For example, model subsystem 116 may input (i) navigation information of a first and second mobile device, (ii) return value information of candidate items, and (iii) account feature compatibility information for the candidate items to a machine learning model to determine an item for presentation on a display device.

However, some input data may be more important than other input data when determining an item for presentation on a display device. For example, although navigation information of mobile devices as well as the account feature compatibility information for candidate items may play a key role in determining an item for presentation, most users seek a positive user experience which may be related to the return value information of the candidate items. For example, in the context of an art museum, as discussed above, art aficionados continuously seek an emotional response from artwork they see. This emotional response (or other return value information) may be a more important factor to consider when determining an item for presentation. Traditional prediction models (e.g., neural networks, convolutional neural networks, support vector machines, etc.) conventionally train prediction models with a randomized set of parameters (e.g., weights, biases, etc.) and randomized hyperparameters (e.g., learning rate, size of network, number of epochs, etc.) to generate predictions. However, when subsets of input data may be more important than other sets of input data, these traditional and conventional prediction models have no way to account for the importance of the sets of input data. To overcome this, a prediction model may be selected based on input data or a subset of input data (e.g., return value information) where hyperparameters correspond to the input data. Additionally, a prediction model may further be configured with differing sets of weights that correspond to the input data or a subset of the input data. In this way, by using a prediction model that is configured based on the input data (or a subset of the input data), the prediction model may generate more accurate predictions regarding a determination of an item to be presented via a display device.

For example, in some embodiments, a prediction model may be selected based on return value information of candidate items. For instance, a machine learning model (e.g., NN, CNN, SVM, etc.) may be selected based on return value information of a first candidate item (e.g., an item of interest to a first user) and a second candidate item (e.g., an item of interest to a second user), where the machine learning model is configured to receive hyperparameter inputs corresponding to the return value information of the first and second candidate items. In some embodiments, display service subsystem 112 may determine a first return value of the first candidate item and a second return value of a second candidate item. Display service subsystem 112 may compare the first return value to the second return value to determine a difference in return value. For example, where the return value information indicates an emotional response value normalized on a scale 0-10 where "0" indicates no emotional response and "10" indicates the highest level of an emotional response, the first return value and the second return value may be compared to determine a difference in return value. For instance, if the first return value is "2" and the second return value is a "10," the difference in return value may be 8. In some embodiments, the difference in return value may correspond to a hyperparameter of a machine learning model. For example, based on difference in return value, a hyperparameter value (e.g., a learning rate value) may correspond to the difference in return value. For instance, as hyperparameters are able to control the learning of a machine learning model (e.g., via a learning rate, size of network, number of epochs, model architecture, etc.), using a difference in return value to select a hyperparameter may be advantageous to generating better predictions.

As an example, when a difference in return value is low (e.g., 0-1, 0-2, 1-2, 2-4, etc.), a learning rate value may be set to a low value (e.g., 0.01, 0.02, 0.03, etc.). Similarly, when a difference in return value is high (e.g., 5-6, 5-7, 6-7, 6-8, 9-10, etc.) the learning rate value may also be high (e.g., 0.05, 0.06, 0.07, etc.). In some instances, the designation of whether a return value is low or high may be based on a predetermined indication. For example, in the context of a return value representing an emotional response value (e.g., being normalized on a scale 1-10), the difference in return value may be "low" when the difference is between 0-5, and may be "high" when the difference is between "6-10." In other embodiments, the designation of a return value may be based on a dynamic evaluation between the return value of a first candidate item and a second candidate item. For example, in the context of a return values being associated with a price of an item, the difference in return value may be based on comparing the price of the first candidate item with respect to the price of the second candidate item. In one use case, if the price of one candidate item is more than double the cost of another candidate item, than the difference in return value may be designated as "high." Conversely, if the price of one candidate item is less than double the cost of another candidate item, than the difference in return value may be designated as "low."

The learning rate may control how quickly a machine learning model adapts to a problem. For example, in accordance with one or more embodiments, the learning rate may affect changes to the parameters (e.g., the weights, biases, or other parameters) of a neural network. For instance, higher learning rates may cause greater changes to the parameters of a neural network. Conversely, lower learning rates may cause smaller changes to the parameters of a neural network. By using a difference in return value to select a hyperparameter's value, a machine learning model may generate better predictions. For example, it is particularly advantageous to base a learning rate on a difference of return value between a first item and a second item. For instance, when the difference of return value is low, the return value information may have less of an impact of determining a item to be presented via a display device. Conversely, when the difference of return value is high, the return value information may have a greater impact of determining an item to be presented via a display device. For example, if a first item has a high emotional return value (e.g., evokes a great emotional response) and a second item has a low emotional return value (e.g., evokes little emotional response), the return value may indicate a great difference with respect to the first and second item. This in return may be an important factor when generating a prediction associated with which of the first or second item to be presented via a display device. Thus, a hyperparameter value, such as the learning rate, may be set to a higher value as opposed to when the return value difference is less. In this way, the return value information of items may affect the determinization of which item to be presented via a display device more than other input information (e.g., navigational information or account feature compatibility information).

In some embodiments, a difference in return value may correspond to one or more predetermined hyperparameter values. For example, where a hyperparameter value includes a learning rate, a difference in return value may correspond to a predetermined learning rate. For instance, where x indicates a difference in return value and y indicates a learning rate, the difference in return value may correspond to the learning rates: $\{(x,y)\}=\{(0, 0.01), (1, 0.02), (2, 0.03), (3, 0.04), (4, 0.05), (5, 0.06), (6, 0.07), (7, 0.08), (8, 0.09), (9, 0.10), (10, 0.11)\}$. It should be noted that the values presented here are merely exemplary and that other values may exist.

In some embodiments, model subsystem 116 may select a machine learning model from a plurality of machine learning models. For example, each machine learning model stored in model database 136 may be a pretrained machine learning model trained on training data (e.g., navigation information of mobile devices, return value information of items, and account feature compatibility information). Model subsystem 116 may select a machine learning model stored in model database 136 based on a hyperparameter value. For example, each machine learning model stored in model database 136 may have been pretrained with a particular hyperparameter value (e.g., a learning rate). Display service subsystem 112 may determine, based on return value information of candidate items, a difference in return value between candidate items of a candidate item set and may communicate with model subsystem 116 to select a machine learning model that has been pretrained with a hyperparameter value corresponding to the difference in return value. In this way, by selecting a pretrained machine learning model, the machine learning model may be ready for use (e.g., to generate outputs indicating a selection of an item for presentation on a display device) which may reduce the amount of computer processing resources needed (e.g., with respect to training an untrained machine learning model).

However, although selecting a machine learning model based on return value information of items or the corresponding hyperparameters may be useful for generating accurate predictions on which item to be presented on a display device, configuring a machine learning model with different sets of weights corresponding to different types of data may also aid in generating more accurate predictions. For example, by configuring a machine learning model with differing sets of weights that correspond to input data (or a subset of the input data), particular sets of data may be considered as more important or more heavily accounted for during machine learning model training.

In some embodiments, model subsystem 116 may configure a machine learning model with sets of weights, where each set of the sets of weights correspond to input data of the machine learning model. For example, a machine learning model may be trained on sets of training data such as (i) navigation information of mobile devices, (ii) return value information of items, and (iii) account feature compatibility information. In some cases, a particular set of training data (e.g., the navigation information, return value information, and account feature compatibility information) may be more important than another set of training data. For example, the return value information may be deemed as more important than the navigation information or the account feature compatibility information. In some embodiments, each set of data may be associated with a level of importance. The level of importance may be a predetermined numerical value that indicates how important a particular set of data is. For example, with 1 being the least important and 3 being the most important, the navigation information may be the least important at a level of importance of 1, the account feature compatibility information may be at a level of importance of 2, and the return value information may be at a level of importance of 3. The level of importance may correspond to a set of weights for a machine learning model. For example, as opposed to configuring a machine learning model with one or more sets of randomized weights, the machine learning model may be configured with a set of predetermined weights that correspond to a level of importance of a particular set of data. In this way, where some sets of data are more important than others, such data may be more heavily considered (e.g., more important, affect the learning process of the machine learning model more, etc.) to help generate more accurate predictions of which item should be presented.

As an example, the level of importance may correspond to a predetermined matrix of weights. For example, in a case where the return value information of items is more important than the navigation information of mobile device and the account feature compatibility information, the machine learning model may be configured with a predetermined matrix of weights for the return value information, and a predetermined matrix of lower weights for the navigation information and the account feature compatibility information. For instance, a first set of weights may be associated with a first set of weights associated with navigation information of mobile devices, (ii) a second set of weights associated with return value information of items, and (iii) a third set of weights associated with account feature compatibility information, where the second set of weights are weighed higher than the first set of weights and the third set of weights. In some embodiments, the machine learning model may then be trained, in accordance with one or more embodiments, on navigation information of mobile devices, return value information of items, and account feature compatibility information. Although during training, the weights may change (e.g., due to the natural training process of machine learning models), the predetermined weights may help determine which set of the sets of data used for training are more important, thus impacting the learning process to generate more accurate predictions indicating an item to be presented via a display device.

In some embodiments, despite an item being incompatible with a particular account feature set, an item may be displayed in response to an output of a machine learning model. For example, in the context of an art museum where multiple mobile devices are detected (and associated with user accounts, respectively), model subsystem 116 may provide (i) navigation information indicating respective distances of first and second mobile devices relative to a display device, (ii) return value information indicating respective return values associated with candidate items of a candidate item set, and (iii) account feature compatibility information indicating respective compatibilities of the candidate items of the candidate item set with account feature sets associated with the first and second user accounts as input to a machine learning model. The machine learning model may generate an output indicating a selection of an item (e.g., from the candidate item set), to be presented on a display device despite the item being incompatible with a particular user account feature set.

For example, the account feature compatibility information may indicate a first candidate item being compatible with the first account feature set associated with the first user account but incompatible with a second account feature set associated with the second user account. Additionally, the account feature compatibility information may indicate that a second candidate item is compatible with both the first and second account feature sets. Although the first candidate item is incompatible with the second account feature set, the first candidate item may be presented via the display device in response to the machine learning model indicating selection of the first candidate item over the second candidate item based on the return value of the first candidate item being higher than the return value associated with the second candidate item. As explained above, in some cases, the return value information may be crucial when determining an item to be presented via a display device.

As an example, in one use case in the context of a retail store, despite a first candidate product being incompatible with a second account feature set (e.g., associated with another user), or alternatively a second account feature of the second account feature set, the first candidate product may be presented via a display device based on the return value of the first candidate product being higher than the return value associated with a second candidate product. For example, the first candidate product may be a product of interest to a first customer, and the second candidate product of interest may be a product of interest to a second customer. Additionally, the first candidate product may be compatible with an account feature of the first user's account feature set (e.g., a banking balance) based on a price associated with the first candidate product, and the first candidate item may be incompatible with an account feature of the second user's account feature set (e.g., second user's banking balance) based on the price associated with the first candidate product. Although the first candidate product may be incompatible with the second customer's account feature set, the first candidate product may be presented on the display device based on the return value of the first candidate product being higher than the return value associated with second candidate product to air the business in generating more revenue. To clarify, for example, the first candidate product of interest of the first user may be a TV priced at $8000 and the second candidate product of interest of the second user may be a toothbrush priced at $1. The first user may have a banking balance of $10000 and the second user may have a banking balance of $150. Because (i) the TV is priced higher than the second user's banking balance and (ii) the business may reap a higher profit on the sale of the TV, display service subsystem 112 may select the TV for presentation on the display device. In this way, not only are the user's interest preserved (e.g., being able to see their product of interest), but the businesses needs are also preserved as the business may generate more revenue based on the sale of the TV as opposed to the sale of the toothbrush.

In another use case, where the return value associated with candidate items indicate a predicted level of excitement or engagement, a candidate item may be selected (e.g., to be displayed by a display device) over another candidate item based on a predicted higher level of excitement or engagement. For example, in the context of a retail store where a first candidate item is a computer (that is an item of interest of a first user) and a second candidate item is a pencil (that is an item of interest to a second user), a machine learning model may select, respective to the users, the computer to be displayed via a holographic display device. For instance, model subsystem 116 may provide (i) navigation information indicating respective distances of first and second mobile devices (e.g., first and second users) relative to a display device, (ii) predicted levels of excitement (or engagement) associated with the computer and pencil, respectively, and (iii) account feature compatibility information indicating respective compatibilities of the computer and pencil with account feature sets associated with the user accounts of the first and second users as input to a machine learning model. The machine learning model may output an indication of a selection of the computer over the pencil based on the predicted level of excitement associated with the computer being higher than that of the pencil, and display service subsystem 112 may select the computer to be holographically displayed via a holographic display device.

Although an item may be selected based on having the highest predicted level of excitement, to provide a greater user experience among all users (e.g., within proximity of a holographic display device), an item may be selected based on having the highest predicted level of excitement among combined predicted levels of excitement of the item of respective users for another item. For example, a first user may have a first predicted level of excitement associated with a first item (e.g., of interest to the first user) and a second predicted level of excitement associated with a second item (e.g., of interest to a second user). The second user may have a third predicted level of excitement associated with the first item (e.g., of interest to the first user) and a fourth predicted level of excitement associated with the second item (e.g., of interest to the second user). Despite the first candidate item being incompatible with an account feature set of the second user, a machine learning model may indicate selection of the first candidate item to be displayed on the display device based on the first user's first predicted level of excitement being greater than a combined level of excitement for the second candidate item (e.g., the second predicted level of excitement and the fourth predicted level of excitement). To clarify, each of the first and second users may have a respective predicted level of excitement associated with each candidate item (e.g., item of interest) of each user. Where one user's predicted level of excitement for one item is greater than a combined level of excitement for a second item, display service subsystem 112 may select the item associated with level of excitement greater than the combined level of excitement for another item.

For instance, referring back to the computer and pencil example above, where the predicted levels of excitement are normalized on a scale 0-10, with 0 being the lowest level of excitement and 10 being the highest level of excitement, the first user may have a predicted level of excitement of 9 associated with the computer and a predicted level of excitement of 2 associated with the pencil. Additionally, the second user may have a predicted level of excitement of 6 associated with the computer and a predicted level of excitement of 3 associated with the pencil. In such case, the computer may be selected for display on the display device since (i) the first user's predicted level of excitement for the computer is 9 and (ii) the combined level of excitement for the pencil (e.g., 2 and 3) is 5. Thus, because the first user's predicted level of excitement is 9 while the combined predicted level of excitement (e.g., with respect to the first and second users) is merely 5, the computer may be selected for display on the display device to facilitate a greater user experience.

In some embodiments, an item may be displayed based on a mobile device proximity to a display device. For example, sensor subsystem 114 may determine that a first mobile device is not within a proximity threshold of the display device. In response to the first mobile device not being within the proximity threshold of the display device, sensor subsystem 114 may communicate with display service subsystem to display an item despite an output of the machine learning model indicating selection of another item over the item. For example, where the first mobile device is associated with a first user account and a first candidate item and the second mobile device is associated with a second user account a second candidate item, sensor subsystem 114 may determine that the first mobile device is not within a proximity threshold of the display device. Although a machine learning model may generate a prediction of displaying the first candidate item over the second candidate item via the display device, since the first user is no longer near the display device (e.g., within a proximity threshold of the display device), display service subsystem 112 may select the second candidate item to be displayed via the display device. In this way, the user experience may be improved by displaying items to users who are closer than other users to a display device.

While determining items (or other content) to present to users based on navigation information, return value information, account feature compatibility information, or other information may improve a user's experience by providing personalized holographic content, the viewing angles at which the holographic content is presented may also impact the user's experience. With respect to holographic display devices (or other display devices), a poor user experience may occur when a user is located outside of an optimal viewing angle of a holographic presentation of an item. When a user is outside of the optimal viewing angle, a holographic presentation of an item may appear grainy, blurry, distorted, appear unnatural, or otherwise look bad. To overcome these issues associated with viewing angles of holographic display devices, a holographic display system may adjust one or more viewing angles based on a direction of a user such that the user is within a viewing angle of the holographic display device.

In some embodiments, sensor subsystem 114 may detect a user. For example, sensor subsystem 114 may detect a user as being within a proximity threshold of a display device. For instance, as discussed above, sensor subsystem 114 may detect one or more user devices as being within a proximity threshold of a display device. In other embodiments, sensor subsystem 114 may obtain navigation information associated with the mobile devices to detect one or more users. For example, the navigation information may indicate navigational information of a mobile device. For instance, the navigational information may indicate a speed, direction, acceleration, velocity, GPS coordinates, distance, or other navigational information of a mobile device with respect to display device. Sensor subsystem 114 may detect a user in response to the navigational information indicating that a mobile device is within a proximity threshold of the display device. In some embodiments, sensor subsystem 114 may detect one or more users based on one or more Bluetooth beacons, proximity sensors, cameras, infrared sensors, eye-tracking sensors, Near Field Communication (NFC) sensors, motion sensors, video motion sensors, microwave sensors, or other sensors, placed around a display device by transmitting information pertaining to respective distances of mobile devices.

The holographic display system may be configured with one or more viewing angles to present holographic content. More particularly, display devices, such as holographic display devices, may be configured with one or more viewing angles to present holographic content including one or more items for display. For instance, a holographic display device may include one or more display component subsets. For example, each display device may include a motor for physically rotating or moving a holographic display device (e.g., a motor attached to the holographic display device), or one or more integrated component subsets such as lasers, beam splitters or expanders, collimators, spatial light modulators, or other display components (where such integrated component subsets are built-in or integrated into the display device itself). In this way, each holographic display device may be configured with multiple viewing angles either by a physical movement (e.g., by setting a viewing angle by rotating or moving a display device via an attached motor) or by using one of the integrated component subsets (e.g., where each integrated component corresponds to a given viewing angle, or may be adjusted to a different viewing angle). Additionally, in this way, with each holographic display device having multiple display components, the same or different instances of holographic content may be presented via multiple viewing angles concurrently—thereby improving the user experience as a multitude of content may be presented at once.

Figure 2A:
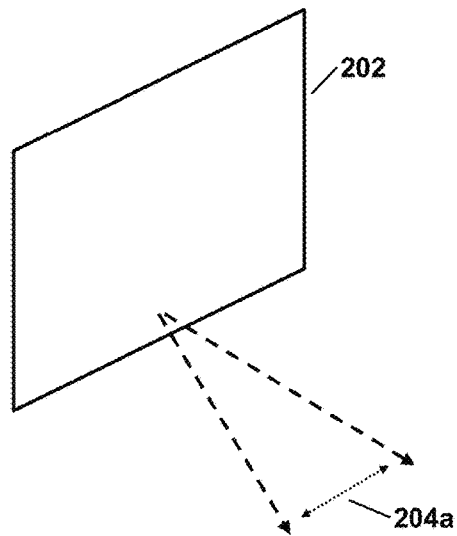
FIGS. 2A-2D show holographic display devices, in accordance with one or more embodiments.
Figure 2B:
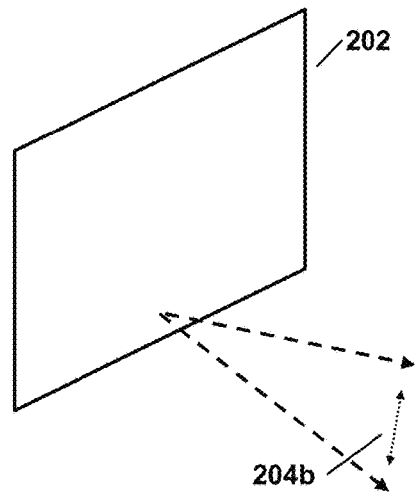

As an example, referring to FIG. 2A, holographic display device 202 may be configured with first viewing angle 204*a*. As another example, referring to FIG. 2B, holographic display device 202 may be configured with a second viewing angle 204*b* (e.g., that may be different from first viewing angle 204*a* of FIG. 2A). Holographic display device 202 may be configurable or configured with multiple viewing angles and enabled to simultaneously provide holographic presentations via the multiple viewing angles. For instance, where multiple users are within a proximity threshold of the display device, the display device may present a holographic presentation of an item (or other content) to the multiple users where each user is located at different view angles. As an example, with respect to FIG. 2C, holographic display device 202 may be configured with a third viewing angle 204*c*, a fourth viewing angle 204*d*, and a fifth viewing angle 204*e*. Each viewing angle (e.g., 204*c*, 204*d*, and 204*e*) may present a holographic representation to multiple corresponding users (e.g., a user corresponding to the third viewing angle 204*c*, a second user corresponding to the fourth viewing angle 204*d*, and a third user corresponding to fifth viewing angle 204*e*). For instance, holographic content, such as an item for display may be presented simultaneously via each viewing angle. That is a first user located within third viewing angle 204c may see a first item, a second user within fourth viewing angle 204d may see a second item, and a third user within fifth viewing angle 204e may see a third item or other holographic content simultaneously. Furthermore, referring to FIG. 2D, holographic display device 202 may be configured with sixth viewing angle 204f, seventh viewing angle 204g, and eight viewing angle 204h.

Figure 2C:
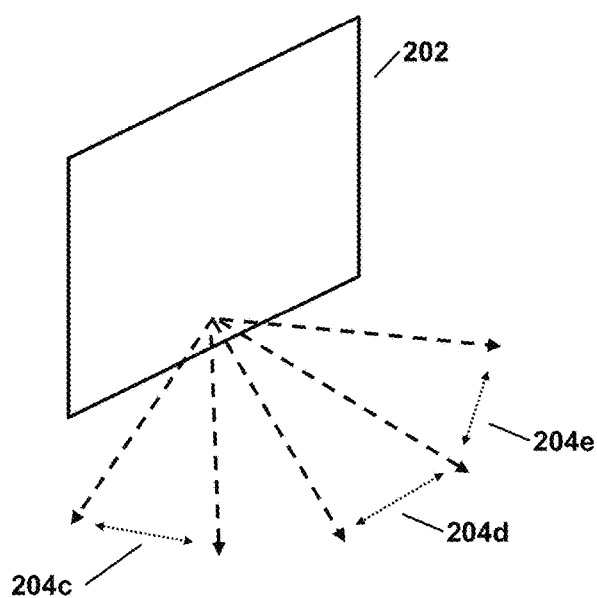
Figure 2D:
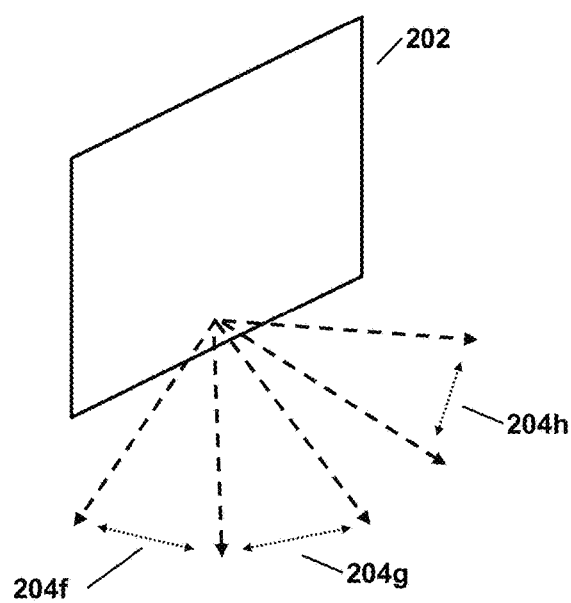

Each viewing angle of FIGS. 2A-2D (e.g., viewing angles 204a-204h) may have a set of angle arms corresponding to each viewing angle. For instance, each angle arm may indicate a maximum viewing threshold where a holographic presentation of an item may be considered optimum or clear (e.g., not blurred, grainy, distorted, etc.). For example, for a user to view an optimal (or clear) holographic presentation of an item (whether it be a static image or motion picture), a user may want to be located within the angle arms. For instance, referring to FIG. 2A, a user may want to be located within the two angle arms (e.g., within viewing angle 204a) to visually see an undistorted, optimal, holographic presentation of an item as opposed to being outside of the two angle arms. Referring to FIG. 2C, different viewing angles may have different viewing angle arms. For instance, third viewing angle 204c may have different angle arms as compared to fourth viewing angle 204d. As users may be walking through an area with such holographic display devices, a user may not always be located within the angle arms (e.g., within the viewing angle) of a holographic display device. Therefore, to overcome these drawbacks and improve the user experience, the holographic display devices may be configured to (i) determine the direction to which a user is location and (ii) adjust based on the direction of a user a viewing angle to cause the direction of the user to be within the viewing angle of the holographic display device.

In some embodiments, display service subsystem 112 may determine a direction of a user. For example, based on the detection of a user being within a threshold distance of a display device, sensor subsystem 114 may communicate with display service subsystem 112 to provide display service subsystem 112 with navigation information of a user's mobile device. For example, display service subsystem 112 may determine the direction of the user based on GPS information associated with the user's mobile device with respect to the holographic display device. For instance, based on the GPS information associated with the user's mobile device, display service subsystem 112 may determine the direction to which a user is location in relation to the display device. As an example, display service subsystem 112 may determine that the user is located at a first angle relative to the display device. For example, the first angle may be an angle to which the user is located, where the angle is measured from a line orthogonal to the center of the display device to the user (e.g., the center being a center point of the display device to which a user may view holographic content). As another example, the first angle may be angle to which the user is located where the angle is measured from a line perpendicular to the center of the display device to the user.

In other embodiments, display service subsystem 112 may determine a direction of a user based on the one or more sensors of sensor subsystem 114, including, but not limited to one or more cameras, proximity sensors, infrared sensors, eye-tracking sensors, Near Field Communication (NFC) sensors, motion sensors, video motion sensors, microwave sensors, or other sensors. As an example, sensor subsystem 114 may provide image data from the one or more cameras to display service subsystem 112, and display service subsystem 112 may determine from the image data the direction in which a user is located. For example, display service subsystem 112 may perform one or more object localization algorithms on received image data to determine the direction of one or more users. As discussed above, the direction of a user may be based on a determined first angle. In this way, as will be explained later, the first angle (e.g., indicating the direction of a user) may be used to determine an appropriate viewing angle to present holographic content to a user, or may be used to rotate or move a holographic display device such that a user is located within a viewing angle. Additionally, sensor subsystem 114 may provide display service subsystem 112 eye tracking information from one or more eye tracking sensors. Such eye-tracking information may indicate whether or not users are looking at a particular holographic display device or not.

In some embodiments, display service subsystem 112 may determine a first viewing angle of the holographic display device. For example, the display device may be preconfigured or preset to a default viewing angle. For instance, the default viewing angle may be set to be centered relative to the holographic display device (e.g., as shown in FIG. 2A). In other embodiments, the default viewing angle may be set to another viewing angle (E.g., third viewing angle 204c of FIG. 2C). As an example, where a holographic display device is located in a corner of a room, the default viewing angle may be set to third viewing angle 204c as user may be more likely to view a holographic presentation of an item from the third viewing angle 204c as opposed to a holographic display device that is located in the center of a room (e.g., where the default viewing angle may be set to the center of the holographic display device, such as first viewing angle 204a of FIG. 2A). Display service subsystem may determine a first viewing angle to which the display device is currently configured to and as will be explained later, may adjust the first viewing angle such that a user may be located within the first viewing angle.

In some embodiments, where each holographic display device includes multiple subsets of display components, each holographic display device may be configured having one subset of display components activated and the others deactivated. For example, by having a default setting (e.g., being configured to a default centered viewing angle or having one or more subsets of display components activated at a given time), the holographic display devices may conserve power. Upon detecting a user being within a threshold distance of a holographic display device, the display service subsystem 112 may determine the direction to which a user is located and may determine a viewing angle to which the holographic display device is currently configured to. For example, where a holographic display device has one subset of display components activated and the others deactivated, display service subsystem 112 may determine which subset of display components is activated, and based on the subset of display components that is activated, may determine the first viewing angle of the holographic display device.

In some embodiments, based on the determined direction of a user, display service subsystem 112 may select one viewing angle over another viewing angle to present a holographic presentation of an item to a user. For instance, where a holographic display device includes multiple subsets of display components each configured for a corresponding viewing angle, display service subsystem may select the viewing angle to present holographic content to a user based on the user's location. For example, referring to FIG. 2C, a user may be determined to be located within viewing angle 204e, however, the default viewing angle may be set to viewing angle 204d. Display service subsystem 112 may select a viewing angle based on the determined direction of the user—thereby improving the user experience. For instance, display service subsystem 112 may determine that the viewing angle is currently set to viewing angle 204d. Based on the direction (or location) of the user to which a holographic representation of an item is to be displayed, display service subsystem 112 may select the viewing angle to which the user is located in as opposed to viewing angles to which the user is not located in. As an example, where the user is located within fifth viewing angle 204e, display service subsystem 112 may select the fifth viewing angle 204e over third viewing angle 204c or fourth viewing angle 204d.

In some embodiments, display service subsystem 112 may adjust the viewing angle of a holographic display device based on the direction of the user. For example, display service subsystem 112 may adjust the viewing angle of the holographic display device based on the selection of another viewing angle. For instance, display service subsystem 112 may adjust the first viewing angle of the holographic display device for a holographic presentation of content where the user becomes within the adjusted first viewing angle of the holographic display device.

In one use case, where the holographic display device includes one or more subsets of display components, each display component subset of the display component subsets may include one or more lasers, beam splitters or expanders, collimators, more spatial light modulators or other display components. Based on the direction of the user (or the selected viewing angle), display service subsystem 112 may adjust the current viewing angle to a viewing angle corresponding to the direction of the user by adjusting at least one of the display component subsets for a holographic presentation to the user. For example, the adjustment may be performed by moving one or more subsets of the display components of the display device. For instance, display service subsystem 112 may move one or more subsets of the display components such that the direction of the user may be within the adjusted viewing angle. For example, each subset of display components may be moveable within the display device itself. As another example, the display device itself may rotate about an origin point (e.g., by moving or rotating the display device itself via a motor), based on the direction of a user, such that the user is located within the first viewing angle/adjusted viewing angle. As yet another example, the display device itself may move left, right, up, down, or in another direction relative to the ground such that the user is located within the first viewing angle/adjusted viewing angle. In this way, the user experience may be improved as the user may become within the adjusted viewing angle of the holographic display device and may visually see a clear holographic presentation of an item that is not blurry, grainy, or otherwise distorted.

In some embodiments, display service subsystem 112 may adjust a viewing angle of a holographic display device where there is no overlap between one or more viewing angles. For example, in conjunction with adjusting a viewing angle, display service subsystem 112 may adjust another viewing angle to ensure there is no overlap between two or more viewing angles. For instance, the holographic display device may be configured to present different holographic content (e.g., representations of items or other holographic representations) to different users at the same time. To accomplish this, where sensor subsystem 114 may detects at least two users, display service subsystem may adjust respective viewing angles to allow the two users to each see a clear presentation of holographic content by adjusting the viewing angles where there is no overlap between the two viewing angles. As an example, referring to FIG. 2C, display service subsystem 112 may determine that the first viewing angle is currently set to fourth viewing angle 204d. However, a first user may be located in the direction of third viewing angle 204c. During the first viewing angle's adjustment to third viewing angle 204c, display service subsystem 112 may adjust a second viewing angle (e.g., for a second user) to fifth viewing angle 204e so there is no overlap between third viewing angle 204c and fifth viewing angle 204e. As such, the first user (being located in the third viewing angle 204c) may see first holographic content that may be the same or different holographic content with respect to the second user (e.g., located in the fifth viewing angle 204e). In this way, different holographic content (that may be personalized to the user in accordance with one or more embodiments) may be presented to different users without causing a blurry, grainy, or distorted image to occur.

In some embodiments, a viewing angle of the holographic display device may be adjusted where there is less than a threshold degree of overlap between a first and second viewing angle. For instance, although the clearest holographic presentation of an item or other content may be achieved by ensuring that there is no overlap between viewing angles, in some instances it may not be possible to present holographic content to users without at least some overlap of viewing angles based on the direction of one or more users. For example, some users may not be able to relocate in a direction to which no overlap of viewing angles is possible. As such, display service subsystem 112 may determine the directions of these users and may nonetheless present holographic content to such users, even where there is a small amount of overlap between one or more viewing angles. For example, to improve the user experience in a small room while presenting the clearest possible holographic presentation of content, display service subsystem 112 may adjust one or more viewing angles where there is less than a threshold degree of overlap between one or more viewing angles. For instance, the threshold degree of overlap may be 1 degree, 2 degrees, 3 degrees, 5 degrees, 10 degrees, or other degree threshold.

In one use case, where a holographic display device is located in a small room with multiple users, sensor subsystem 114 may detect a first and second user as being within a threshold distance of the holographic display device. Each of the first and second user may be located close to one another (e.g., within 1 feet of each other, 2 feet of each other, or other distance), and based on the configuration of the holographic display device, a first viewing angle and a second viewing angle (e.g., corresponding to the first and second users, respectively) may share more than a threshold degree of overlap (e.g., greater than 3 degrees, greater than 5 degrees, etc.). Due to the first and second viewing angle sharing more than a threshold degree of overlap, light rays may collide with one another and cause a distorted image. Thus, to provide a clear holographic presentation of content to the first and second user, while the first viewing angle is being adjusted, the second viewing angle may also be adjusted where the first and second viewing angle share less than a threshold degree of overlap. For example, where the threshold degree of overlap is 5 degrees, display service subsystem 112 may adjust the first and second viewing angles to have less than 5 degrees of overlap. In this way, each of the first and second user may visually experience the clearest possible holographic content—thereby improving the user experience.

In some embodiments, a viewing angle may be selected based on a predicted future location of a user. For example, sensor subsystem 114 may obtain navigation information of a given user via a mobile device of the user. As discussed above, the navigation information may include a direction, acceleration, velocity, GPS coordinates, or other navigational information of a user. Sensor subsystem 114 may provide the navigation information to display service subsystem 112 to determine a predicted future location (or direction) of the user. In some embodiments, display service subsystem 112 may communicate with model subsystem 116 to obtain one or more machine learning models configured to predict a future location of the user. As an example, a machine learning model (e.g., a neural network, convolutional neural network, support vector machine, or other machine learning model) may be trained on historical navigation information of one or more users (e.g., stored model database 136) and may be configured to output a predicted location of a user. In other embodiments, where the holographic display system includes one or more eye-tracking sensors, a machine learning model may be trained on historical eye-tracking information of one or more users (e.g., stored model database 136) and may be configured to output a predicted location of a user.

For example, model subsystem 116 may train or configure one or more prediction models to facilitate one or more embodiments described herein. In some embodiments, such models may be used to select an item to be displayed via a display device. As an example, such models may be trained or configured to perform the foregoing functions by respectively mutually mapping input data and output data in nonlinear relationships based on learning (e.g., deep learning). Additionally, one or more pre-trained prediction models may be stored in model database 136. For example, model database 136 may store a plurality of machine learning models configured to generate predictions related to selecting the most suitable item to be displayed via a display device.

In some embodiments, referring to FIG. 4, machine learning model 402 may be trained based on training data comprising (i) navigation information of mobile devices with respect to a display device or (ii) eye-tracking information to generate predictions related to future locations (or directions) of a user. For example, the navigation information of mobile devices may include speeds, directions, accelerations, velocities, GPS coordinates, distances, or other navigational information of mobile devices with respect to display device. As another example, the eye-tracking information may include information such as time periods to which a user is looking at a display device, eye movements indicating a user is going to move to another location (e.g., where a user is looking to the left, the user may move to the left or where a user is looking to the right, the user may move to the right, etc.) In some embodiments, machine learning model 402 may be trained on such training data. For instance, machine learning model 402 may take the training data as input 404, and generate a prediction indicating a future location of a given user as output 406. For example, the prediction may be GPS coordinates indicating a future location of a user, a spatial location of a user with respect to a center of a display device (e.g., 2 feet to the right, 5 feet out from the display device), or other metric indicating a location of a user. In some embodiments, the generated prediction indicating future location of a user may be fed back into machine learning model 402 to update one or more configurations (e.g., weights, biases, or other parameters) based on its assessment of its prediction (e.g., outputs 406) and reference feedback information (e.g., user indication of accuracy, reference labels, or other information).

As an example, referring back to FIG. 1, in some embodiments, model subsystem 116 may provide training data to a prediction model to train a prediction model. For instance, in some embodiments, model subsystem 116 may obtain a prediction model (e.g., a machine learning model) from model database 136. In such a case, model subsystem 116 may train the selected prediction model based on training data (e.g., navigation information, eye-tracking information, etc.) obtained from one or more mobile devices detected to be within a proximity threshold of a display device, and such navigation information may be used to train the prediction model. Once the prediction model is trained, model subsystem 116 may provide the prediction model with inputs (e.g., navigation information of a given user) to generate a prediction of a future location of the user.

In some embodiments, a viewing angle of a holographic display device may be selected based on a predicted future location of the user. For example, display service subsystem 112 may obtain a machine learning model from model subsystem 116 to predict a future location of the user. For instance, display service subsystem 112 may provide navigation information of a user's device as input to the machine learning model to generate an output indicating a predicted future location of the user. Display service subsystem 112 may then select a viewing angle of multiple viewing angles (e.g., to which the display device is configured) based on the predicted future location of the user and may adjust the viewing angle to the selected viewing angle (to which the user may visually see a holographic presentation of holographic content). For example, display service subsystem 112 may select a viewing angle to which the predicted future location of the user may be within. As an example, referring to FIG. 2C, a user may currently be located within fourth viewing angle 204d. Display service subsystem 112 may obtain the predicted future location of the user and may determine that the predicted future location of the user is within third viewing angle 204c. Display service subsystem 112 may then select third viewing angle 204c, and may adjust the viewing angle (to which the holographic display device is currently set) to the third viewing angle 204c while the user is within the current viewing angle. In this way, the holographic display system may dynamically adjust presentation of holographic content based on user locations, thereby improving the user experience.

In some embodiments, a viewing angle may be expanded for a holographic presentation of holographic content. For instance, to ensure that the user is able to see a clear presentation of holographic content while the user moves from one location to the next, the holographic display system may expand the viewing angle to which a user is currently located in. As opposed to conventional systems that have no mechanism for expanding a viewing angle, the user experience may be improved by allowing the user to move from one location to the next while being able to see holographic content in an undistorted manner. For example, with respect to FIG. 2D, a user may be currently located within sixth viewing angle 204f. However, display service subsystem 112 may determine that the user is moving and that the user's predicted future location may be within seventh viewing angle 204g. To allow the user to visually see the clearest presentation of holographic content, display service subsystem 112 may expand the viewing angle to encompass both sixth viewing angle 204f and seventh viewing angle 204g.

As an example, to expand the viewing angle to encompass both sixth viewing angle 204f and seventh viewing angle 204g, display service subsystem 112 may present a holographic presentation of content to both the sixth viewing angle 204f and 204g simultaneously. For instance, as the user is located within sixth viewing angle 204f, display service subsystem 112 may select seventh viewing angle 204g (e.g., corresponding to the user's predicted location). In response to the selection of seventh viewing angle 204g, display service subsystem 112 may adjust seventh viewing angle 204g (e.g., such that there is no overlap, such that there is partial overlap of 1, 2, 3, or more degrees) where the user's predicted future location may become within seventh viewing angle 204g. As another example, the same holographic presentation of content being displayed via the sixth viewing angle 204f may be presented via seventh viewing angle 204g. In this way, as the user moves from the current location corresponding to sixth viewing angle 204f to the user's predicted future location corresponding to seventh viewing angle 204g, the user may see an undistorted holographic presentation of content.

In some embodiments, a viewing angle may be adjusted prior to a user arriving at a predicted future location. For example, in the context of a user moving outside of a current viewing angle, display service subsystem 112 may determine via model subsystem 116 a predicted future location of a user. As the viewing angle may be currently set to a first viewing angle, when the user moves to the future location, to ensure the user is able to see a clear presentation of holographic content, the viewing angle may adjust prior to the user's arrival at the predicted future location. For instance, display service subsystem 112 may adjust the current viewing angle of the holographic display system where the current location of the user remains within an adjusted viewing angle and that the predicted future location of the user is within the adjusted viewing angle of the holographic display system. For example, referring to FIG. 2C, a user may currently be located in fourth viewing angle 204d and it predicted to be located in fifth viewing angle 204e. Display service subsystem 112 may adjust fourth viewing angle 204d to include fifth viewing angle 204e prior to the user arriving at the predicted future location. As an example, as the user moves from the current location (e.g., corresponding to fourth viewing angle 204d) to the user's predicted future location (e.g., corresponding to fifth viewing angle 204e), display service subsystem 112 may dynamically adjust the fourth viewing angle to encompass the fifth viewing angle 204e by rotating display device 202. For instance, the user may remain within fourth viewing angle 204d, however, because display device 202 is rotating as the user moves from the current location to the user's predicted future location, the user may remain within the fourth viewing angle 204d until the user stops moving (e.g., the user's predicted future location), which may encompass the fifth viewing angle 204e. In this way, the user may be able to see a clear holographic presentation of holographic content while moving from location to the next—thereby improving the user's experience.

Example Flowchart

Figure 5:
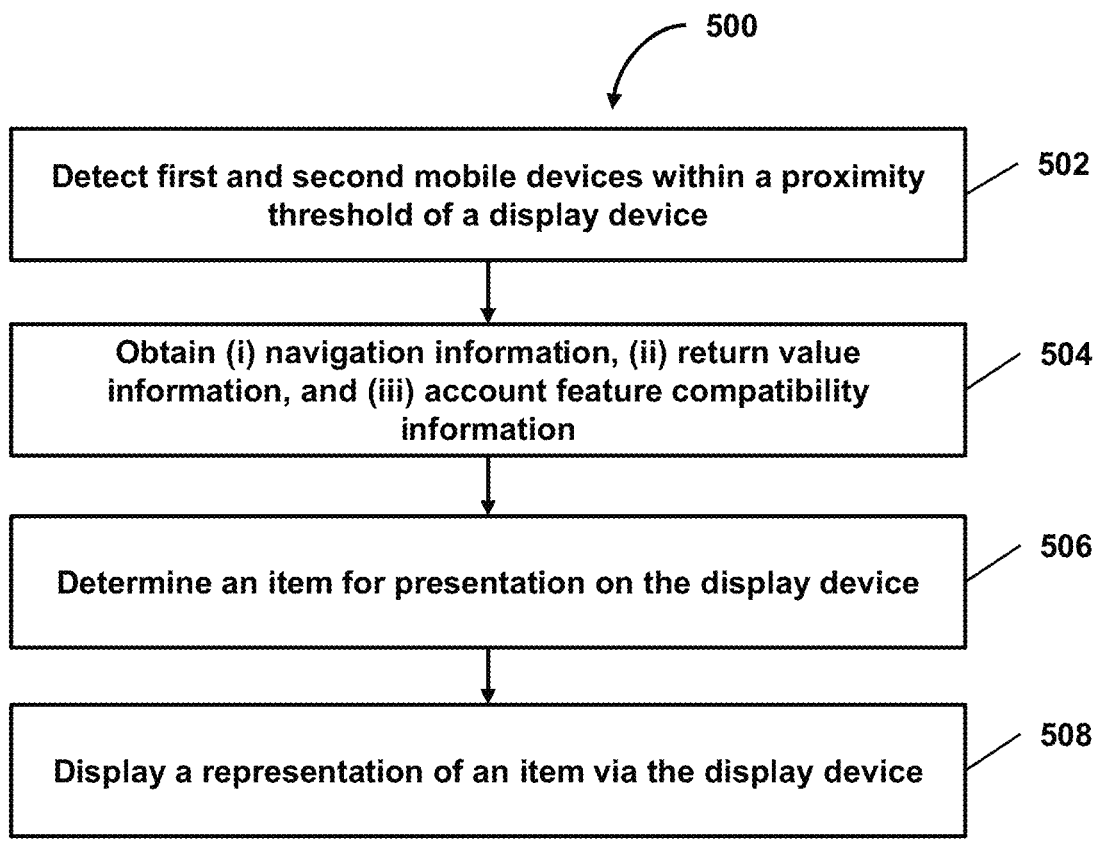
FIG. 5 shows a flowchart of a method for holographically displaying items based on item compatibility with user account features, in accordance with one or more embodiments.
Figure 6:
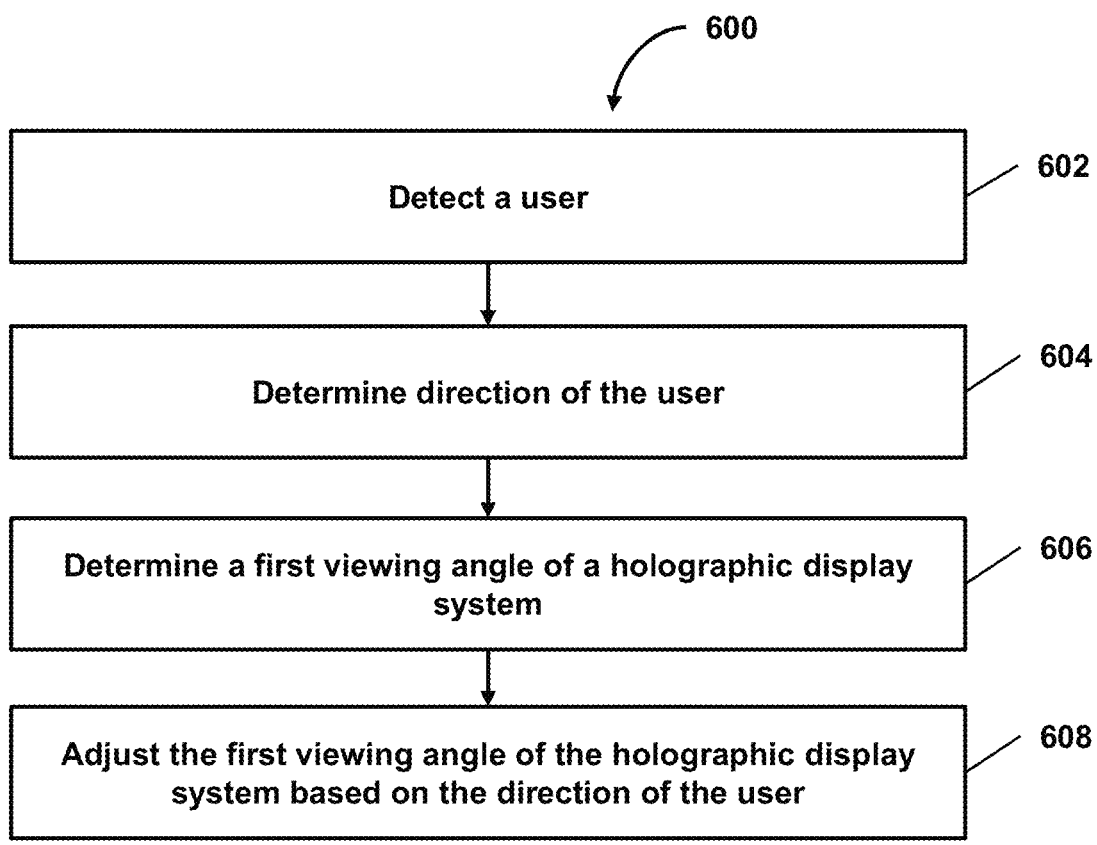
FIG. 6 shows a flowchart of a method for adjusting a viewing angle of a holographic display system, in accordance with one or more embodiments.

FIGS. 5 and 6 is an example flowchart of processing operations of methods that enable the various features and functionality of the system as described in detail above. The processing operations of the methods presented below are intended to be illustrative and non-limiting. In some embodiments, for example, the methods may be accomplished with one or more additional operations not described, and/or without one or more of the operations discussed. Additionally, the order in which the processing operations of the method are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 5 shows a flowchart of a method for holographically displaying items based on item compatibility with user account features, in accordance with one or more embodiments.

In an operation 502, first and second mobile devices may be detected to be within a proximity threshold of a display device. For example, one or more sensors related to a display device may detect a first and second mobile device as being within a proximity threshold of the display device. For example, the proximity threshold may indicate a threshold distance between a mobile device and the display device. In some embodiments, the first and second mobile devices may respectively be associated with a first user account and a second user account. Operation 502 may be performed by a subsystem that is the same as or similar to sensor subsystem 114, in accordance with one or more embodiments.

In an operation 504, (i) navigation information, (ii) return value information, and (iii) account feature compatibility information may be obtained. For example, the navigation information may indicate respective distances of the first and second mobile devices relative to the display device. As another example, the return value information may indicate respective return values associated with candidate items of a candidate item set. As yet another example, the account feature compatibility information may indicate respective compatibilities of candidate items of the candidate item set associated with the first and second user accounts. In some embodiments, the account feature compatibility information may indicate (a) a first candidate item being compatible with a first account feature set associated with the first user account but incompatible with a second account feature set associated with the second user account and (b) a second candidate item being compatible with both the first and second account feature sets. Operation 504 may be performed by a subsystem that is the same as or similar to display service subsystem 112, in accordance with one or more embodiments.

In an operation 506, an item for presentation on the display device may be determined. For example, the (i) navigation information for the first and second mobile devices, (ii) the return value information for the candidate items, and (iii) the account feature compatibility information for the candidate items may be provided to a machine learning model to determine an item for presentation on the display device. Operation 506 may be performed by a subsystem that is the same as or similar to model subsystem 116, in accordance with one or more embodiments.

In an operation 508, a representation of an item may be displayed via the display device. For example, despite the first candidate item being incompatible with a second account feature set for the second mobile device, a representation of the first candidate item may be displayed via a display device. For example, the representation of the first candidate item may be displayed in response to an output of the machine learning model indicating selection of the first candidate item over the second candidate item. For instance, the output of the machine learning model may be based on a first return value associated with the first candidate item being higher than a second return value associated with the second candidate item. Operation 508 may be performed by a subsystem that is the same as or similar to display service subsystem 112, in accordance with one or more embodiments.

FIG. 6 shows a flowchart of a method for adjusting a viewing angle of a holographic display system, in accordance with one or more embodiments.

In an operation 602, a user may be detected. As an example, the user may be detected via one or more sensors associated with a holographic display system. As a further example, the user may be detected as being within a distance threshold of the holographic display system. In one use case, the holographic display system may be configured with multiple viewing angles, such as a first viewing angle having a first set of arms, a second viewing angle having a second set of arms (e.g., different from the first set of arms). In another use case, the holographic display system may be configured to simultaneously provide holographic presentations via the multiple viewing angles. Operation 602 may be performed by a subsystem that is the same as or similar to sensor subsystem 114, in accordance with one or more embodiments.

In an operation 604, a direction of the user may be determined (e.g., based on the detection of the user). As an example, the direction of the user may be a relative direction of the user with respect to the holographic display system (e.g., a direction of the user relative to a center or other origin point of a holographic presentation of the holographic display system, a direction of the user relative to one or more components of the holographic display system, etc.). Operation 604 may be performed by a subsystem that is the same as or similar to display service subsystem 112, in accordance with one or more embodiments.

In an operation 606, a first viewing angle of the holographic display system may be determined. As an example, the first viewing angle may be determined for providing a first holographic presentation to the user. As a further example, based on the direction of the user, the first viewing angle may be selected over a second viewing angle of the holographic display system for the first holographic presentation to the user. Operation 606 may be performed by a subsystem that is the same as or similar to display service subsystem 112, in accordance with one or more embodiments.

In an operation 608, the first viewing angle of the holographic display system may be adjusted for the first holographic presentation to the user based on the direction of the user. As an example, the first viewing angle may be adjusted such that the user (e.g., a current location of the user) becomes within the adjusted first viewing angle of the holographic display system. Operation 608 may be performed by a subsystem that is the same as or similar to display service subsystem 112, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132, which may include account database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically store information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes, and is not intended to be limiting, as any of subsystems 112-116 may provide more or less functionality than is described. For example, one or more of subsystems 112-116 may be eliminated, and some or all of its functionality may be provided by other ones of subsystems 112-116. As another example, additional subsystems may be programmed to perform some or all of the functionality attributed herein to one of subsystems 112-116.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

A1. A method comprising: detecting, first and second user devices as being within a proximity threshold of a holographic display system, the first user device being associated with a first user account, the second user device being associated with a second user account; obtaining, based on the detection, (i) navigation information of the first and second user devices, (ii) return value information indicating respective return values associated with candidate items, and (iii) account feature compatibility information indicating respective compatibilities of candidate items with account feature sets associated with the first and second user accounts; inputting, to a machine learning model, (i) the navigation information for the first and second user devices, (ii) the return value information for the candidate items, and (iii) the account feature compatibility information for the candidate items to determine an item for presentation on the holographic display system; and despite a first candidate item being incompatible with a second account feature set for the second user device, displaying a first holographic representation of the first candidate item based on an output of the machine learning model indicating selection of the first candidate item over the second candidate item.

A2. The method of the preceding embodiment wherein, the detection is based on one or more sensors.

A3. The method of the preceding embodiment wherein, the sensors are related to the holographic display system.

A4. The method of any of the preceding embodiments, wherein the first or second user device is determined to be a closer user device or a farther user device, respectively, to the holographic display system.

A5. The method of the preceding embodiment, wherein determining the closer and farther user device further comprises: determining, based on the navigation information, (i) a first proximity value associated with the first user device and the holographic display system and (ii) a second proximity associated with the second user device and the holographic display system; determining, based on the first and second proximity values, whether the second proximity value is less than the first proximity value; and based on the second proximity value being less than the first proximity value, determining that the second user device is closer to the holographic display system than the first user device and that the first user device is farther from the holographic display system.

A6. The method of any of the preceding embodiments, further comprising: selecting, based on the return value information for the candidate items, the machine learning model from a model database, wherein the machine learning model is configured to receive hyperparameter inputs corresponding to the return value information for the candidate items.

A7. The method of any of the preceding embodiments, further comprising: providing training data to the machine learning model to train the machine learning model, wherein the training data comprises (i) navigation information of user devices with respect to a holographic display system, (ii) return value information of items, and (iii) account feature compatibility information, and wherein the machine learning model comprises sets of weights, wherein the sets of weights comprise (i) a first set of weights associated with the navigation information of the user devices with respect to a holographic display system, (ii) a second set of weights associated with the return value information of items, and (iii) a third set of weights associated with the account feature compatibility information, and wherein the second set of weights are weighed higher than the first set of weights and the third set of weights.

A8. The method of the preceding embodiments, wherein the navigation information of the user devices is navigation information of the user devices with respect to a holographic display system.

A9. The method of any of the preceding embodiments, wherein determining that the first candidate item is compatible with the first account feature set but incompatible with the second account feature set and that the second candidate item is compatible with both the first and second account feature sets further comprises: comparing the first candidate item to each account feature of the first account feature set associated with the first user to determine whether the first candidate item is compatible with a first threshold amount of account features of the first account feature set; based on the first candidate item being compatible with the threshold amount of account features of the first account feature set, determining that the first candidate item is compatible with the first account feature set associated with the first user; comparing the first candidate item to each account feature of the second account feature set associated with the second user to determine whether the first candidate item is compatible with a second threshold amount of account features of the second account feature set; based on the first candidate item being incompatible with the second threshold amount of account features of the second account feature set, determining that the first candidate item is incompatible with the second account feature set associated with the second user; comparing the second candidate item to each account feature of the first and second account feature sets associated with the first and second user, respectively, to determine whether the second candidate item is compatible with a third and fourth threshold amount of account features of the first and second account feature sets, respectively; and based on the second candidate item being compatible with the third and fourth threshold amount of account features of the first and second account feature sets, respectively, determining that the second candidate item is compatible with both the first and second account feature sets associated with the first and second users, respectively.

A10. The method of any of the preceding embodiments, wherein the one or more sensors related to the holographic display system comprises at least one of Bluetooth beacons, proximity sensors, cameras, or infrared sensors.

A11. The method of any of the preceding embodiments, wherein the navigation information comprises at least one of a distance, direction, speed, velocity, or acceleration of the first and second user devices relative to the holographic display system, respectively.

A12. The method of any of the preceding embodiments, further comprising: determining that the first user device is not within a proximity threshold of the holographic display system; and in response to the first user device not being within the proximity threshold of the holographic display system, displaying a second holographic representation of the second candidate item despite the output of the machine learning model indicating selection of the first candidate item over the second candidate item.

A13. The method of any of the preceding embodiments, further comprising: determining that the first and second user devices are not within a proximity threshold of the holographic display system; and based on the first and second user devices not being within a proximity threshold of the holographic display system, displaying the first holographic representation of the first candidate item during a first time duration and displaying a second holographic representation of the second candidate item during a second time duration, wherein the second time duration occurs subsequent to the first time duration.

B1. A method comprising: detecting a user (e.g., via one or more sensors associated with a holographic display system, the holographic display system being configured with a first viewing angle); determining a direction of the user (e.g., based on the detection of the user); determining the first viewing angle of the holographic display system; and adjusting, based on the direction of the user, the first viewing angle of the holographic display system for a first holographic presentation to the user (e.g., such that the user becomes within the adjusted first viewing angle of the holographic display system).

B2. The method of the preceding embodiment, wherein determining the first viewing angle comprises selecting, based on the direction of the user, the first viewing angle over a second viewing angle of the holographic display system for the first holographic presentation to the user, and wherein adjusting the first viewing angle comprises adjusting, based on the selection, the first viewing angle of the holographic display system for the first holographic presentation to the user such that the user becomes within the adjusted first viewing angle of the holographic display system.

B3. The method of any of the preceding embodiments, wherein the holographic display system is configured with multiple viewing angles and enabled to simultaneously provide holographic presentations via the multiple viewing angles.

B4. The method of any of the preceding embodiments, the operations further comprising: in conjunction with adjusting the first viewing angle of the holographic display system, adjusting a second viewing angle of the holographic display system such that there is no overlap between the adjusted first and second viewing angles.

B5. The method of any of the preceding embodiments, the operations further comprising: in conjunction with adjusting the first viewing angle of the holographic display system, adjusting a second viewing angle of the holographic display system such that there is less than a threshold degree of overlap between the adjusted first and second viewing angles.

B6. The method of any of the preceding embodiments, the operations further comprising: in conjunction with adjusting the first viewing angle of the holographic display system, adjusting a second viewing angle of the holographic display system such that there is less than five degrees of overlap between the adjusted first and second viewing angles.

B7. The method of any of the preceding embodiments, the operations further comprising: selecting, based on a direction of a second user, a second viewing angle of the holographic display system for a second holographic presentation to the second user; and while the user is within the adjusted first viewing angle, adjusting, based on the selection of the second viewing angle, the second viewing angle of the holographic display system for the first holographic presentation to the second user such that the second user becomes within the adjusted second viewing angle of the holographic display system.

B8. The method of any of the preceding embodiments, the operations further comprising: selecting, based on a predicted future location of the user, a third viewing angle of the holographic display system for the first holographic presentation to the user; and while the user is within the adjusted first viewing angle, adjusting, based on the selection of the third viewing angle, the third viewing angle of the holographic display system such that the predicted future location becomes within the adjusted third viewing angle of the holographic display system.

B9. The method of any of the preceding embodiments, wherein adjusting the third viewing angle comprises, while the user is within the adjusted first viewing angle, expanding an overall viewing angle for the first holographic presentation by adjusting, based on the selection of the third viewing angle, the third viewing angle of the holographic display system such that (i) the predicted future location becomes within the adjusted third viewing angle of the holographic display system and (ii) the adjusted first and third viewing angles only partially overlaps with one another by one or more degrees.

B10. The method of any of the preceding embodiments, wherein adjusting the first viewing angle comprises: initially adjusting the first viewing angle of the holographic display system at a first time such that a current location of the user becomes within the adjusted first viewing angle of the holographic display system at the first time; predicting a future location of the user; and prior to the user arriving at the predicted future location, further adjusting, based on the predicted future location of the user, the first viewing angle of the holographic display system such that (i) the current location of the user remains within the adjusted first viewing angle of the holographic display system and (ii) the predicted future location of the user becomes within the adjusted first viewing angle of the holographic display system.

C1. A tangible, non-transitory, machine-readable medium storing instructions that, when executed by a data processing apparatus, cause the data processing apparatus to perform operations comprising those of any of the foregoing method embodiments.

C2. A system comprising: one or more processors; and memory storing instructions that, when executed by the processors, cause the processors to effectuate operations comprising those of any of the foregoing method embodiments.

What is claimed is:

1. A system for holographically presenting items based on item compatibility with account features and user proximity to holographic display devices, the system comprising:
one or more Bluetooth beacons; and
one or more processors executing computer program instructions that, when executed, cause operations comprising:
detecting, via the one or more Bluetooth beacons, first and second wearable devices associated with first and second user accounts as being within respective distances from a holographic display device, wherein the second wearable device is detected to be a closer wearable device of closer to the holographic display device than the first wearable device, and the first wearable device is detected to be a farther wearable device farther from the holographic display device than the second wearable device;

in response to detecting the closer and farther wearable devices, determining a candidate item set comprising a first candidate item of interest to the farther user and a second candidate item of interest to the closer user;

inputting, to a machine learning model, (i) the distances of closer and farther wearable devices from the holographic display device, (ii) predicted user response value information for the first and second candidate items, and (iii) account feature compatibility information for the first and second candidate items to determine an item for presentation on the holographic display device at least while the closer and farther wearable devices are within a threshold distance from the holographic display device, the user response value information indicating a first user response value associated with the first candidate item higher than a second user response value associated with the second candidate item, the account feature compatibility information indicating (a) the first candidate item being compatible with a first account feature set associated with the first user account but incompatible with a second account feature set associated with the second user account and (b) the second candidate item being compatible with both the first and second account feature sets; and despite the first candidate item being incompatible with the second account feature set for the closer wearable device, displaying a first holographic representation of the first candidate item in response to an output of the machine learning model indicating selection of the first candidate item over the second candidate item, the output of the machine learning model being based on the first user response value associated with the first candidate item being higher than the second user response value associated with the second candidate item.

2. The system of claim 1, wherein the detection of the closer and farther wearable devices further comprises:

determining, based on the first wearable device associated with the first user account and the one or more Bluetooth beacons, a first distance between the first wearable device and the one or more Bluetooth beacons, wherein the one or more Bluetooth beacons are associated with the holographic display device;

determining, based on the second wearable device associated with the second user account and the one or more Bluetooth beacons, a second distance between the second wearable device and the one or more Bluetooth beacons; and in response to the second distance being less than the first distance, determining that the second wearable device is closer to the holographic display device than the first wearable device and that the first wearable device is farther from the holographic display device.

3. The system of claim 1, further comprising:

selecting, based on the user response value information of the first and second candidate items, the machine learning model from a model database, wherein the machine learning model is configured to receive hyperparameter inputs corresponding to the user response value information of the first and second candidate items.

4. The system of claim 1, further comprising:

providing training data to the machine learning model to train the machine learning model, wherein the training data comprises (i) distances of wearable devices with respect to a holographic display device, (ii) return value information of items, and (iii) account feature compatibility information, and wherein the machine learning model comprises sets of weights, wherein the sets of weights comprise (i) a first set of weights associated with the distances of the wearable devices with respect to a second holographic display device, (ii) a second set of weights associated with the user response value information of items, and (iii) a third set of weights associated with the account feature compatibility information, and wherein the second set of weights are weighed higher than the first set of weights and the third set of weights.

5. A method comprising:

detecting, via one or more sensors related to a holographic display device, first and second mobile devices as being within a proximity threshold of the holographic display device, the first mobile device being associated with a first user account, the second mobile device being associated with a second user account;

obtaining, based on the detection, (i) navigation information indicating respective distances of the first and second mobile devices relative to the holographic display device, (ii) user response value information indicating respective user response values associated with candidate items of a candidate item set, and (iii) account feature compatibility information indicating respective compatibilities of candidate items of a candidate item set with account feature sets associated with the first and second user accounts, the account feature compatibility information indicating (a) a first candidate item being compatible with a first account feature set associated with the first user account but incompatible with a second account feature set associated with the second user account and (b) a second candidate item being compatible with both the first and second account feature sets;

inputting, to a machine learning model, (i) the navigation information for the first and second mobile devices, (ii) the user response value information for the candidate items, and (iii) the account feature compatibility information for the candidate items to determine an item for presentation on the holographic display device; and despite the first candidate item being incompatible with the second account feature set for the second mobile device, displaying a first holographic representation of the first candidate item in response to an output of the machine learning model indicating selection of the first candidate item over the second candidate item, the output of the machine learning model being based on a first user response value associated with the first candidate item being higher than a second user response value associated with the second candidate item.

6. The method of claim 5, further comprising:

determining, based on the navigation information, (i) a first proximity value associated with the first mobile device and the holographic display device and (ii) a second proximity associated with the second mobile device and the holographic display device;

determining, based on the first and second proximity values, whether the second proximity value is less than the first proximity value; and in response to the second proximity value is less than the first proximity value, determining that the second mobile device is closer to the holographic display device than the first mobile device and that the first mobile device is farther from the holographic display device.

7. The method of claim 5, further comprising:
selecting, based on the user response value information for the candidate items, the machine learning model from a model database, wherein the machine learning model is configured to receive hyperparameter inputs corresponding to the user response value information for the candidate items.

8. The method of claim 5, further comprising:
providing training data to the machine learning model to train the machine learning model, wherein the training data comprises (i) navigation information of mobile devices with respect to a second holographic display device, (ii) user response value information of items, and (iii) account feature compatibility information, and
wherein the machine learning model comprises sets of weights, wherein the sets of weights comprise (i) a first set of weights associated with the navigation information of the mobile devices with respect to a second holographic display device, (ii) a second set of weights associated with the user response value information of items, and (iii) a third set of weights associated with the account feature compatibility information, and wherein the second set of weights are weighed higher than the first set of weights and the third set of weights.

9. The method of claim 5, further comprising:
comparing the first candidate item to each account feature of the first account feature set associated with the first user to determine whether the first candidate item is compatible with a first threshold amount of account features of the first account feature set;
in response to the first candidate item being compatible with the threshold amount of account features of the first account feature set, determining that the first candidate item is compatible with the first account feature set associated with the first user;
comparing the first candidate item to each account feature of the second account feature set associated with the second user to determine whether the first candidate item is compatible with a second threshold amount of account features of the second account feature set;
in response to the first candidate item being incompatible with the second threshold amount of account features of the second account feature set, determining that the first candidate item is incompatible with the second account feature set associated with the second user;
comparing the second candidate item to each account feature of the first and second account feature sets associated with the first and second user, respectively, to determine whether the second candidate item is compatible with a third and fourth threshold amount of account features of the first and second account feature sets, respectively; and
in response to the second candidate item being compatible with the third and fourth threshold amount of account features of the first and second account feature sets, respectively, determining that the second candidate item is compatible with both the first and second account feature sets associated with the first and second users, respectively.

10. The method of claim 5, wherein the one or more sensors related to the holographic display device comprises at least one of Bluetooth beacons, proximity sensors, cameras, or infrared sensors.

11. The method of claim 5, wherein the navigation information comprises at least one of a distance, direction, speed, velocity, or acceleration of the first and second mobile devices relative to the holographic display device, respectively.

12. The method of claim 5, further comprising:
determining that the first mobile device is not within a proximity threshold of the holographic display device; and
in response to the first mobile device not being within the proximity threshold of the holographic display device, displaying a second holographic representation of the second candidate item despite the output of the machine learning model indicating the selection of the first candidate item over the second candidate item.

13. The method of claim 5, further comprising:
determining that the first and second mobile devices are not within the proximity threshold of the holographic display device; and
in response to the first and second mobile devices not being within the proximity threshold of the holographic display device, displaying the first holographic representation of the first candidate item during a first time duration and displaying a second holographic representation of the second candidate item during a second time duration, wherein the second time duration occurs subsequent to the first time duration.

14. One or more non-transitory computer-readable media comprising instructions that, when executed by one or more processors, cause operations comprising:
detecting, via one or more sensors related to a holographic display system, first and second mobile devices as being within a proximity threshold of the holographic display system, the first mobile device being associated with a first user account, the second mobile device being associated with a second user account;
obtaining, based on the detection, (i) navigation information indicating respective distances of the first and second mobile devices relative to the holographic display system, (ii) return value information indicating respective return values associated with candidate items of a candidate item set, and (iii) account feature compatibility information indicating respective compatibilities of candidate items of a candidate item set with account feature sets associated with the first and second user accounts, the account feature compatibility information indicating (a) a first candidate item being compatible with a first account feature set associated with the first user account but incompatible with a second account feature set associated with the second user account and (b) a second candidate item being compatible with both the first and second account feature sets;
inputting, to a machine learning model, (i) the navigation information for the first and second mobile devices, (ii) the return value information for the candidate items, and (iii) the account feature compatibility information for the candidate items to determine an item for presentation on the holographic display system; and
despite the first candidate item being incompatible with the second account feature set for the second mobile device, displaying a first holographic representation of the first candidate item in response to an output of the machine learning model indicating selection of the first candidate item over the second candidate item, the output of the machine learning model being based on a first return value associated with the first candidate item being higher than a second return value associated with the second candidate item.

15. The media of claim 14, the operations further comprising:
   determining, based on the navigation information, (i) a first proximity value associated with the first mobile device and the holographic display system and (ii) a second proximity associated with the second mobile device and the holographic display system;
   determining, based on the first and second proximity values, whether the second proximity value is less than the first proximity value; and
   in response to the second proximity value is less than the first proximity value, determining that the second mobile device is closer to the holographic display system than the first mobile device and that the first mobile device is farther from the holographic display system.

16. The media of claim 14, the operations further comprising:
   selecting, based on the return value information for the candidate items, the machine learning model from a model database, wherein the machine learning model is configured to receive hyperparameter inputs corresponding to the return value information for the candidate items.

17. The media of claim 14, the operations further comprising:
   providing training data to the machine learning model to train the machine learning model, wherein the training data comprises (i) navigation information of mobile devices with respect to a second holographic display system, (ii) return value information of items, and (iii) account feature compatibility information, and
   wherein the machine learning model comprises sets of weights, wherein the sets of weights comprise (i) a first set of weights associated with the navigation information of the mobile devices with respect to a holographic display system, (ii) a second set of weights associated with the return value information of items, and (iii) a third set of weights associated with the account feature compatibility information, and wherein the second set of weights are weighed higher than the first set of weights and the third set of weights.

18. The media of claim 14, the operations further comprising:
   comparing the first candidate item to each account feature of the first account feature set associated with the first user to determine whether the first candidate item is compatible with a first threshold amount of account features of the first account feature set;
   in response to the first candidate item being compatible with the threshold amount of account features of the first account feature set, determining that the first candidate item is compatible with the first account feature set associated with the first user;
   comparing the first candidate item to each account feature of the second account feature set associated with the second user to determine whether the first candidate item is compatible with a second threshold amount of account features of the second account feature set;
   in response to the first candidate item being incompatible with the second threshold amount of account features of the second account feature set, determining that the first candidate item is incompatible with the second account feature set associated with the second user;
   comparing the second candidate item to each account feature of the first and second account feature sets associated with the first and second user, respectively, to determine whether the second candidate item is compatible with a third and fourth threshold amount of account features of the first and second account feature sets, respectively; and
   in response to the second candidate item being compatible with the third and fourth threshold amount of account features of the first and second account feature sets, respectively, determining that the second candidate item is compatible with both the first and second account feature sets associated with the first and second users, respectively.

19. The media of claim 14, the operations further comprising:
   determining that the first mobile device is not within the proximity threshold of the holographic display system; and
   in response to the first mobile device not being within the proximity threshold of the holographic display system, displaying a second holographic representation of the second candidate item despite the output of the machine learning model indicating selection of the first candidate item over the second candidate item.

20. The media of claim 14, the operations further comprising:
   determining that the first and second mobile devices are not within the proximity threshold of the holographic display system; and
   in response to the first and second mobile devices not being within the proximity threshold of the holographic display system, displaying the first holographic representation of the first candidate item during a first time duration and displaying a second holographic representation of the second candidate item during a second time duration, wherein the second time duration occurs subsequent to the first time duration.

\* \* \* \* \*